(12) United States Patent
Nolting et al.

(10) Patent No.: US 6,721,405 B1
(45) Date of Patent: Apr. 13, 2004

(54) INTERCONNECT TRAFFIC ANALYSIS

(75) Inventors: Thomas A. Nolting, Holliston, MA (US); Karen Dion, Dudley, MA (US)

(73) Assignee: Verizon Services Corp., Arlington, VA (US)

( * ) Notice: Subject to any disclaimer, the term of this patent is extended or adjusted under 35 U.S.C. 154(b) by 906 days.

(21) Appl. No.: 09/188,680

(22) Filed: Nov. 10, 1998

Related U.S. Application Data

(63) Continuation-in-part of application No. 09/048,102, filed on Mar. 26, 1998, now Pat. No. 6,282,267.

(51) Int. Cl.$^7$ .......................... H04M 15/00; H04M 1/24
(52) U.S. Cl. .............. 379/133; 379/112.01; 379/112.06; 379/114.01; 379/114.28; 379/115.01; 379/121.01; 379/134; 379/32.01
(58) Field of Search ................................. 379/113, 133, 379/134, 34, 111, 112, 114, 115, 116, 121, 112.01, 112.06, 114.01, 114.28, 114.29, 115.01, 115.03, 121.01, 121.05, 126, 32.01, 137, 138, 139, 140

(56) References Cited

U.S. PATENT DOCUMENTS

| | | | |
|---|---|---|---|
| 4,456,788 A | | 6/1984 | Kline et al. |
| 4,760,594 A | | 7/1988 | Reed |
| 4,788,718 A | | 11/1988 | McNabb et al. |
| 5,008,929 A | | 4/1991 | Olsen et al. |
| 5,285,494 A | | 2/1994 | Sprecher et al. |
| 5,333,183 A | | 7/1994 | Herbert |
| 5,359,649 A | | 10/1994 | Rosu et al. |
| 5,425,087 A | | 6/1995 | Gerber et al. |
| 5,438,570 A | * | 8/1995 | Karras et al. ................ 379/133 |
| 5,457,729 A | | 10/1995 | Hamann et al. |
| 5,475,732 A | | 12/1995 | Pester, III |
| 5,553,129 A | * | 9/1996 | Partridge, III ............... 379/220 |
| 5,563,930 A | | 10/1996 | Pester, III |
| 5,566,235 A | * | 10/1996 | Hetz ........................... 379/201 |
| 5,579,371 A | | 11/1996 | Aridas et al. |
| 5,592,530 A | | 1/1997 | Brockman et al. |
| 5,701,301 A | * | 12/1997 | Weisser, Jr. .................. 370/428 |

(List continued on next page.)

OTHER PUBLICATIONS

Hewlett Packard Brochure entitled "HP 37900A and 37900B Signaling Test Sets", Technical Data for "Get the best from Signaling System No. 7".

Hewlett Packard Brochure entitled "Wide area networking protocol analysis solutions for the long run." re HP 4954A wide area network protocol analyzer, 1987.

(List continued on next page.)

*Primary Examiner*—Curtis Kuntz
*Assistant Examiner*—Quoc Tran
(74) *Attorney, Agent, or Firm*—Leonard C. Suchyta, Esq.

(57) ABSTRACT

Interconnect traffic between local exchange carrier (LECS) networks and other carrier networks, particularly competitive local exchange carrier (CLEC) networks, dictates a need for efficient monitoring and analysis of the interconnect traffic. In accord with the invention, monitor equipment on the LEC network captures call related messages produced by the LEC network and compiles data from those messages to form call detail records for the interconnect traffic. These records are loaded into a relational database. A data preparation routine enhances the data, for example, by translating certain codes from the records into more useful text and by spreading or binning usage over predefined time intervals. An on-line analytical processing program runs one or more applications to allow the LEC to analyze the interconnect traffic between the LEC network and the other carrier's network. The analysis provides useful traffic data for accounting purposes, e.g. for use in determining jurisdictional factors for reciprocal compensation calculations. The data also enables the LEC to engineer upgrades of the network to provide cost effective service for the traffic to and from the other carrier's network.

32 Claims, 5 Drawing Sheets

U.S. PATENT DOCUMENTS

| | | | | |
|---|---|---|---|---|
| 5,712,908 A | * | 1/1998 | Brinkman et al. | 379/119 |
| 5,715,294 A | | 2/1998 | Pester, III | |
| 5,737,399 A | | 4/1998 | Witzman et al. | |
| 5,757,895 A | | 5/1998 | Aridas et al. | |
| 5,768,352 A | | 6/1998 | Elliott et al. | |
| 5,774,530 A | | 6/1998 | Montgomery et al. | |
| 5,781,620 A | * | 7/1998 | Montgomery et al. | 379/115 |
| 5,793,839 A | | 8/1998 | Farris et al. | |
| 5,799,073 A | * | 8/1998 | Fleischer, III et al. | 379/113 |
| 5,802,145 A | | 9/1998 | Farris et al. | |
| 5,809,120 A | | 9/1998 | Montgomery et al. | |
| 5,809,121 A | * | 9/1998 | Elliott et al. | 379/127 |
| 5,825,769 A | | 10/1998 | O'Reilly et al. | |
| 5,828,729 A | | 10/1998 | Clermont et al. | |
| 5,835,583 A | | 11/1998 | Hetz et al. | |
| 5,838,769 A | | 11/1998 | McNeil et al. | |
| 5,844,981 A | | 12/1998 | Pitchford et al. | |
| 5,850,426 A | | 12/1998 | Watkins et al. | |
| 5,854,834 A | | 12/1998 | Gottlieb et al. | |
| 5,854,835 A | | 12/1998 | Montgomery et al. | |
| 5,864,608 A | | 1/1999 | Brownmiller et al. | |
| 5,867,558 A | * | 2/1999 | Swanson | 379/34 |
| 5,867,565 A | | 2/1999 | Morikawa | |
| 5,881,140 A | | 3/1999 | Gerault et al. | |
| 5,901,208 A | | 5/1999 | Jabbarnezhad | |
| 5,903,639 A | * | 5/1999 | Lipchock et al. | 379/220 |
| 5,905,785 A | | 5/1999 | Dunn | |
| 5,905,985 A | * | 5/1999 | Malloy et al. | 707/100 |
| 5,907,603 A | | 5/1999 | Gallagher et al. | |
| 5,917,898 A | | 6/1999 | Bassa et al. | |
| 5,937,042 A | | 8/1999 | Sofman | |
| 5,940,471 A | | 8/1999 | Homayoun | |
| 5,949,862 A | | 9/1999 | Fukuzawa et al. | |
| 5,953,403 A | * | 9/1999 | Lefort et al. | 379/220 |
| 5,999,604 A | | 12/1999 | Walter | |
| 6,011,838 A | * | 1/2000 | Cox | 379/113 |
| 6,067,354 A | | 5/2000 | Bauer et al. | |

OTHER PUBLICATIONS

Article entitled "ASQIC 800 Call Data Master", published in AT&T Technical Journal, pp. 21–31, May/Jun. 1987, vol. 66, Issue 3.

Article entitled "By probing your SS7 links, you can gather all sorts of information", published in Wireless Review, May 1, 1998.

Press Release entitled "Inet Technologies Reports Record Revenues for Eleventh Consecutive Quarter" dated Jan. 25, 2001.

"Investor Relations FAQs" published by Inet Technologies, Inc., Sep. 7, 2000.

Promotional materials entitled "Network Operations & Maintenance", "IT: seven Revenue Assurance Applications", "Diagnostics", and "IP/SS7 Interoperability" by Inet Technologies, Inc.

Promotional Brochure entitled "GeoProbe Mobile", published by Inet Technologies, Inc.

Promotional materials published by Inet Technologies, Inc. including GeoProbe Service Provider's Competitive Advantage, GeoCare, and 2 press releases.

Inet Technologies Inc. (INTI) Quarterly Report (SEC form 10–Q), dated Aug. 4, 2000.

New Release entitled AT&T to manage international gateway sites with Inet's GeoProbe system:, dated Jan. 26, 1998.

Hewlett Packard 1991 "Test & Measurement Catalog", entitled "Data Communications Test Equipment", p. 567.

Hewlett Packard Brochure entitled "Unlock the secrets of Signaling System No. 7—fast", HP 37900B and 37900C Signaling Test Sets.

Hewlett Packard Brochure entitled "GSM Signaling Test System", HP 37900 Product Note–1.

"Can you afford to be without SS7 network surveillance?" by Rex R. Hester, Telephony, Dec. 3, 1990.

"Telecommunications", International Edition, vol. 23, No. 8, Aug. 1989.

Article entitled "Test and Measurement Techniques for GSM", from Telecommunications, Dec. 1989 issue.

"Gentia Software, Section 3: Query and Reporting Tools", by META Group, Inc., *Data Warehousing Tools Bulletin* (Aug. 1997); pp, 3615–3620.

* cited by examiner

US 6,721,405 B1

INTERCONNECT TRAFFIC ANALYSIS

CROSS-REFERENCE TO RELATED APPLICATION

This application is a continuation-in-part of U.S. patent application Ser. No. 09/048,102 filed on Mar. 26, 1998 entitled NETWORK PLANNING TRAFFIC MEASUREMENT PROGRAM, the disclosure of which is entirely incorporated herein by reference.

TECHNICAL FIELD

The present invention relates to a method and system for analyzing call specific data records for traffic between different carriers' portions of a telecommunication network, in order to reconcile accounting information regarding such traffic and/or to identify significant traffic patterns for engineering purposes.

Acronyms

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Asynchronous Digital Subscriber Line (ADSL)
ANswer Message (ANM)
Automatic Message Accounting (AMA)
Call Detail Record (CDR)
Calling Party Number (CPN).
Carrier Identification Code (CIC)
Centi-Call Second (CCS)
Central Office (CO)
Competitive Local Exchange Carrier (CLEC)
Common Channel Interoffice Signaling (CCIS)
Common Language Location Identifier (CLLI)
Customer Record Information System (CRIS)
Destination Point Code (DPC)
End Office (EO)
Global Title Translation (GTT)
Initial Address Message (IAM)
Integrated Services Digital Network (ISDN)
ISDN User Part (ISDN-UP or ISUP)
Inter-exchange Carrier (IXC)
Internet Service Provider (ISP)
Landing Zone (LZ)
Line Identification DataBase (LIDB)
Local Area Network (LAN)
Local Exchange Carrier (LEC)
Local Access and Transport Area (LATA)
Loop Maintenance Operations Systems (LMOS)
Message Signaling Unit (MSU)
Message Transfer Part (MTP)
Multi-Dimensional DataBase (MDDB)
Numbering Plan Area (NPA)
Online Analytical Processing (OLAP)
Origination Point Code (OPC)
Operations, Maintenance Application Part (OMAP)
Percent of Inter-LATA Usage (PIU)

Percent of Local Usage (PLU)
Personal Computer (PC)
Public Switching Telephone Network (PSTN)
Release Complete Message (RLC)
Release Message (REL)
Service Switching Point (SSP)
Signaling Link Selection code (SLC)
Signaling System 7 (SS7)
Signaling Point (SP)
Signaling Transfer Point (STP)
Structured Query Language (SQL)
Transaction Capabilities Applications Part (TCAP)
Wide Area Network (WAN)

BACKGROUND ART

Recent legislative and regulatory changes have created a more open service provider environment in the telecommunications industry. In this new environment, more and more companies are offering local exchange services as competitive local exchange carriers (CLECs), that is to say, entering the local market in direct competition with the Regional Bell Operating Company (RBOC) or independent company serving as the incumbent local exchange carrier (LEC).

A CLEC may lease certain unbundled elements of the LEC's network at reduced rates for resale. For example, the CLEC may lease an unbundled port on an end office switch, as a point of access to the LEC's switch and the subscriber loops. The CLEC then connects its own switch network to the unbundled port. Alternatively, the CLEC may operate its own independent switching facilities and loop plant. In either case, the regulatory requirements mandate that the CLEC facilities must be integrated into the public switching telephone network (PSTN) in a seamless manner from the customer's perspective. As such, the customers must be able to make and receive telephone calls using existing dialing patterns, without any apparent distinction in processing as a result of service through the CLEC. The regulatory environment therefore places certain burdens on the incumbent LEC, to provide an efficient interconnection to the CLEC's facilities and to provide mechanisms for compensation between the parties for calls interconnected between the two carriers' networks.

Interconnect Traffic is generally defined as any calls which are routed and "handed-off" from one carrier to another. This may take the form of Independent, Interexchange Carrier, or Cellular service providers directing traffic to or receiving traffic from a local switch of the LEC. Typically, the LEC must provide tandem capacity and trunking to one or more exchanges of any of these other carriers, including the CLECs, to carry the interconnect traffic between the carriers' networks. In particular, the CLECs demand that the LEC provide sufficient capacity to minimize blockages on calls to and from the CLEC networks.

Also, disputes arise over the amount and direction of such traffic, for example, as it relates to billing and compensation issues. Network interconnection, required under Section 251(c)(2) of the Telecommunications Act, requires that charges for the transport and termination of traffic provide for the mutual and reciprocal recovery by each carrier of its costs associated with transport and termination. As part of the compensation process, each party declares jurisdictional calling factors for the traffic, such as the Percent of Inter-LATA Usage (PIU) and the Percent of Local Usage (PLU), in an attempt to separate the billing of the reciprocal compensation charges for local traffic from the switched access charges for non-local traffic. The issues and problems associated with reciprocal compensation payments and PLU/PIU factoring are growing, as traffic volumes increase.

For this compensation system, one local carrier pays a charge to the other local carrier for each call originating in the one carrier's network and terminated in the other carrier's network. Reciprocal charges are accumulated for terminations in both directions and offset each other. The carrier originating more calls into the other carrier's network pays the terminating carrier the difference in the charges.

Incumbent local service providers today are in an unfortunate position where they are unable to effectively measure usage or quality of service to CLECs and consequently cannot validate the associated terminating charges. Any inaccuracies in the CLEC's declaration of the jurisdictional calling factors results in a significant increase in the incumbent LEC's expense associated with CLEC interconnection.

The theory underlying this portion of the Act is that the accurately reported traffic should be substantially equal in both directions, from the LEC to the CLEC and from the CLEC to the LEC, therefore typically any reciprocal compensation between the carriers should be relatively low. This theory assumes that the CLEC customers are predominantly normal telephone customers, who make about as many calls as they receive and the CLECs accurately report jurisdictional factors.

Adding end offices, specialized switching modules, trunks, tandem offices and the like to meet new demands such as those of CLEC interconnection requires considerable expense. Accurate engineering, to minimize cost and yet provide effective service to the various customers, becomes ever more essential. To provide effective engineering, it is necessary that the LEC understand the traffic involved. Such understanding requires accurate and complete traffic measurement. Accurate information also is necessary to resolve disputes, for example with the CLECs over compensation, service quality and the like.

Today, there is no easy way to accurately measure traffic between two carriers' networks, for example, so as to accurately identify the true point of origin for each call terminated within a CLEC network. For example, the LEC should not pay any kind of termination charges to the CLEC for calls that passed through the LEC's network but did not actually originate from the LEC's network, for example inter-LATA calls coming in through an IXC network not directly connected to the CLEC network. Currently, the CLEC accumulates records for calls terminated in the CLEC's network that passed through the LEC's network, without distinguishing point of origin. The LEC must trust the CLEC to bill for however many calls were terminated to them. Clearly, there is a need for a system that enables the LEC to accurately determine what calls routed through the LEC tandem really came from another network or provider.

Also, certain practices of the CLECs in developing their business actually are contrary to the theory of reciprocal compensation under the Act. As noted, the compensation theory was based on an expectation that the CLEC customers would originate about as many calls out of the CLEC network as they receive incoming calls. At least some of the CLECs, however, have heavily marketed their network services to customers having only incoming calls. In such cases, the CLECs are actually turning the reciprocal compensation system into a major added profit center, contrary to the intent of the Telecom Act.

One example of this incoming call business that is particularly troublesome relates to CLEC service to large numbers of access lines for Internet Service Providers (ISPs) Many CLECs have established business plans, which target ISPs as their primary customers. These CLECs have designed their networks to deliver locally dialed LEC customer traffic to an ISP. Such a call originates from a LEC's local customer, and the call terminates on a CLEC owned NXX to the ISP. The CLEC provides the ISP with low or no cost access to the LEC's customers and receives compensation from the LEC for every minute of internet traffic originated from customer on the LEC switches.

This type of service is exploding. Internet access service places huge traffic demands on the LEC's network. Also, the pattern of such traffic, with calls to a limited number of destinations and long average hold times, tends to exacerbate congestion problems. The termination of the calls to an ISP actually provides the caller with access to an international network. As such, the termination is not really to a local customer of the CLEC. The LECs argue that these calls should not be subject to reciprocal compensation because they are not intra-LATA calls, under the definition of the Telecom Act. A call bound for the Internet should be an inter-LATA call. Currently, there is no way to identify and quantify such calls from a LEC network to an ISP subscribing to telephone service through a CLEC.

The CLEC's ISP service strategy distorts the balance of reciprocal compensation payments between the two local carriers in the CLEC's favor. The result of this market trend is an increase in the interconnection expenses as the number of CLECs who have identified this interconnection model as their primary business continues to grow and as those already operating under this model migrate into more and more territories served by incumbant LECs.

For the reasons outlined above, a need exists for an effective technique to measure traffic passing between two networks, such as the networks of a LEC and a CLEC, and analyze the patterns of such traffic. A more specific need is for a technique to measure traffic, identify traffic patterns and determine therefrom what traffic should and should not be subject to reciprocal compensation between the two carriers. A need also exists for a technique to identify problems of traffic congestion relating to interconnection of LEC and CLEC networks. Another need exists to provide a tool for analysis of the patterns of the traffic across the interface between the networks, for example, to show how the patterns do or do not conform to the regulatory model forming the basis for the fee structures between these two parties.

A number of techniques have been developed for monitoring operations of the public switching telephone network. While these prior techniques may be effective for some purposes, they have not proven effective for analyzing interconnect traffic, particularly to and from a CLEC. To complete the understanding of the background of the invention, it may be helpful to briefly consider some of the prior techniques for network monitoring.

U.S. Pat. No. 5,475,732 Pester describes an SS7 Network Preventative Maintenance System for detecting potential SS7 and switched network troubles, automatically analyzing the troubles, and providing alarm and corrective action to avoid major network events. The Pester SS7 Real Time Monitor System described in that Patent is a multi-stage SS7 network preventative maintenance tool that traps SS7 messages, detects potential SS7 and switched network troubles, automatically analyzes those troubles, and provides alarm and corrective action instructions to maintenance personnel.

U.S. Pat. No. 5,592,530 to Brockman et al. relates to an SS7 monitoring system for evaluating the operations of telephone switches by capturing data between signaling nodes of a telephone switching system. The Brockman et al. surveillance equipment captures signaling information from different signaling network paths within a mated pair of signaling transfer points (STPs) pair and correlates the fragmented messages for each monitored call. The system is capable of generating call detail records from the SS7 messages of a mated pair cluster, for use in billing and fraud detection.

While the above discussed Pester and Brockman et al. Patents describe the usefulness of monitoring an SS7 common channel interoffice signaling network for event detection, neither of these patents is directed to the particular problems of traffic measurement addressed by the present invention. The Pester Patent places emphasis on monitoring of the SS7 network itself in order to detect troubles in its functioning. The Brockman et al. Patent focuses on monitoring of all links to the STPs in a pair and the assembly of related SS7 signaling messages to form a record of call completions.

While these methodologies may be effective for their stated purposes there remains a distinct need for an efficient and effective tool for monitoring and analyzing the traffic passing between networks of different carriers, specifically between the networks of LECs and CLECs. Attempts to use other more traditional approaches, such as the accumulation of data from the switches themselves and the Engineering and Administrative Data Acquisition System fell short of providing the desired information.

For example, today, a LEC conducts studies on usage in an office by setting up a "busy study" with respect to specific individual lines served through that office. It is not possible to look at all the traffic in the office at one time.

It is accordingly an object of this invention to provide a relatively low cost solution to the problems outlined above.

It is another object of the invention to provide a timely, powerful, cost effective means of analyzing traffic on the Public Switching Telephone Network (PSTN), to accurately quantify interconnect traffic between the networks of different carriers.

It is a further object of the invention to provide a flexible, expedient, accurate, and cost-effective method to identify and analyze congestion and related traffic problems for such interconnect traffic.

It is another object of the invention to measure and quantify interconnect traffic in such a manner as to facilitate accurate compensation and accounting between the carriers.

It is yet another object of the invention to implement Internet related traffic studies and enable analysis of Internet traffic to CLEC customers.

DISCLOSURE OF THE INVENTION

The invention addresses the above stated needs by providing effective techniques for tracking traffic through a telecommunication network in such a manner as to enable analysis of interconnect traffic between two carriers' networks. Aspects of the invention encompass both methods and systems for accumulating the necessary call data from monitoring of the network and analysis of the call data with regard to the interconnect traffic.

The call records are developed from monitoring or compiling of items of information from certain management data messages used by the carriers' networks. Management data here refers to information generated by the telecommunication network for its operations purposes, for example, interoffice signaling messages generated to control call set-up and tear-down. Another example of such data would be messages sent from central offices of the network to an accounting office, for record keeping and billing purposes.

Thus, a first aspect of the invention relates to a method of analyzing interconnect traffic between two carriers' networks. The method involves capturing management data messages communicated by a first carrier's telecommunication network during processing of calls associated with a second carrier's telecommunication network. From these messages, the method compiles detailed records of interconnect calls crossing an interface between the two carriers' networks. The detailed records of interconnect calls are loaded into a table in a database for further processing. The processing forms data indicative of interconnect call traffic crossing the interface between the networks.

The processing of the call records enables one of the carriers to determine various significant characteristics of the interconnect traffic that crosses the interface during the period of the study. For example, the carrier can determine how much of the traffic is local traffic or how much of the traffic is inter-LATA traffic. For either type of traffic, the carrier can perform a common analysis of all such traffic or separately study traffic originating or terminating in the other carrier's network.

The present invention enables such analysis of interconnect traffic between any two carriers' networks. An area of principle interest, however, relates to interconnect traffic between a LEC and a CLEC of the public telephone network.

Thus, another aspect of the invention relates to a method of analyzing interconnect traffic between a local exchange carrier (LEC) and a competing local exchange carrier (CLEC). This method involves trapping signaling messages exchanged between a telephone network of the LEC and a telephone network of the CLEC, during processing of calls associated with the CLEC network by the LEC network. The trapped signaling messages are processed to form call detail records for calls associated with the CLEC telephone network that have been processed by the LEC telephone network. The method involves processing of the call detail records, to form aggregate data regarding the interconnect traffic between the LEC and CLEC telephone networks.

In an actual network, all calls between two carrier's network are interoffice calls. The preferred embodiments of the present invention utilize real time monitors on selected common channel interoffice signaling links to collect messages relating to set-up and tear-down of interconnect calls. A site processor compiles data from the interoffice signaling messages relating to individual calls, to form call detail records (CDRs) for interconnect call attempts. The site processor uploads the CDRs to a central server. The server maintains a relational database for the CDRs derived from the signaling data.

Data from the relational database is processed or 'prepared' and uploaded to a multi-dimensional database. The data preparation includes supplementing the records with reference data and where necessary spreading or "binning" usage data to multiple tracking intervals. The multi-dimensional database provides on-line analytical processing tools for enhanced processing of the call data and offers an efficient graphical user interface, preferably a web suite type interface. Applications running in the multi-dimensional database enable analysis and presentation of study results.

Some applications calculate jurisdictional calling factors such as various percentages based on the interconnect traffic, for example the percentage that relates to local traffic or the percentage that relates to inter-LATA traffic. Another application is an ISP finder application, for identifying destiantion numbers having a large volume of incoming calls and calls having a long average hold time. With the ISP destination numbers known, another application determines the percentage of terminating interconnect traffic that relates to Internet access calls.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWING

The drawing figures depict the present invention by way of example, not by way of limitations. In the figures, like reference numerals refer to the same or similar elements.

DETAILED DESCRIPTION OF THE PREFERRED EMBODIMENTS

Figure 1:
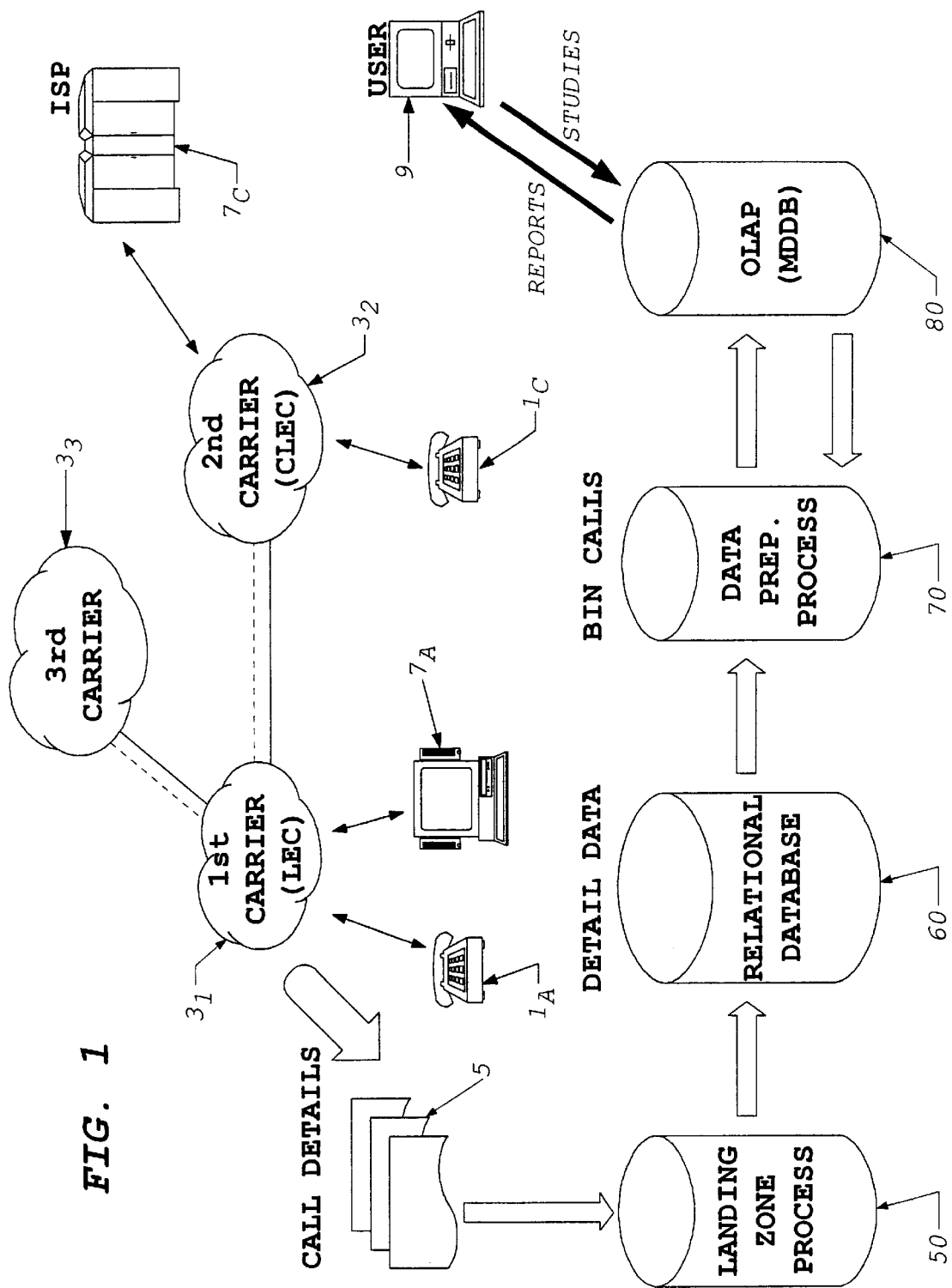
FIG. 1 is a block diagram showing the high-level functional aspects of a traffic track system for analysis of carrier interconnect traffic.

The present invention involves compiling call records from management data of a telecommunication network. Management data here refers to information generated by the telecommunication network for its operations purposes, for example, messages sent from central offices of the network to an accounting office, for record keeping and billing purposes. The preferred embodiment for analysis of interconnect traffic between carriers compiles the detailed call records from interoffice signaling messages generated to control call set-up and teardown.

From the detailed call records, the invention provides tools to analyze the interconnect traffic. Generally, calls routed and "handed-off" from one carrier to another make up interconnect traffic. This may take the form of Independent, Interexchange Carrier, or Cellular service providers directing traffic or receiving traffic from a local exchange carrier's switch. The inventive analysis covers virtually any interconnect traffic crossing the interface between two carriers' networks, but particular emphasis is placed on monitoring and analysis of the interface of a CLEC network to a LEC network.

The traffic tracking techniques of the present invention may provide either carrier a view of the traffic across the interface. For example, the CLEC could monitor signaling and compile the detailed call records for analysis. For purposes of further discussion, however, assume that the LEC chooses to implement the traffic tracking system.

A carrier such as the LEC must pay termination fees to other carriers such as Competitive Local Exchange Carriers (CLECs), for calls handed off to their network (and vice versa). It is important to understand and quantify the number of calls and usage characteristics for the traffic that traverses the LEC network, for engineering purposes and for accounting purposes. For example, it is important for the carrier to understand the distribution of the traffic that goes between these networks, in order to forecast and build the network in the most economical manner. It is also necessary to accurately calculate certain jurisdictional traffic factors to enable accurate reciprocal compensation calculations.

As discussed more below, the detailed call records are loaded into a database, to enable the analytical processing. The analysis of the records from the database meets the carrier's needs for certain traffic information, including for example:

1) Identification of office busy hour and CLEC busy hour;
2) Measure of hourly traffic to an identified NPA/NXX combination belonging to the CLEC;
3) Call attempts;
4) Completed calls;
5) Failed attempts (busy or blocked)
6) Connect time, e.g. in Minutes of Usage (MOU)
7) Average call hold times for calls terminating to the NPA/NXX(s) of the CLEC, for the study period and/or for a busy hour/busy period;
8) Identification of distribution of usage to the CLEC from LEC End Offices; and
9) Call attempts, completed calls, failed attempts, and average call hold time over a predefined period.

The analysis also enables the LEC to measure hourly traffic from an identified NPA/NXX (CALLING NUMBER) combination belonging to the CLEC. This more specific analysis produces information such as:

1) Number of call attempts from the CLEC's NPA/NXX (s);
2) Number of completed calls from the CLEC's NPA/NXX(s);
3) Number of failed attempts (busy or blocked) from the CLEC's NPA/NXX(s);
4) Connect time, e.g. in MOU; and
5) Average call hold times of calls originating from the NPA/NXX(s), for the study period or for a busy hour/busy period.

The information derived from the traffic analysis enables a carrier to determine the volume of interconnect traffic, where it enters and leaves the carrier's network, and the like. The carrier can use this information to facilitate engineering of network upgrades to meet the new traffic demands, to determine the accuracy of bills from the other carrier and challenge such bills if necessary, and to support efforts to convince regulators to reconsider the basis for the mandated compensations schemes.

FIG. 1 provides a high-level illustration of the functions involved in the traffic studies used to analyze interconnect traffic between two carriers. In reality, the public network that we think of as the telephone network comprises many segments operated by different carriers, including local exchange carriers (LECs) and interexchange carriers (IXCs). For purposes of this discussion, FIG. 1 illustrates three such segments or sub-networks. One sub-network is a network $3_1$, operated by a LEC. The second sub-network could be that of an IXC or any other carrier, but for purposes of this discussion, FIG. 1 depicts a second network or segment $3_2$ operated by a Competitive Local Exchange Carrier (CLEC). The first two networks 3 are interconnected by trunk links (solid line) for carrying the actual traffic and by signaling links (dotted line).

FIG. 1 depicts a third carrier's network $3_3$. The third carrier's network connects to the LEC's network $3_1$ through trunk links (solid line) for carrying the actual traffic and through signaling links (dotted line). In a typical example, the third carrier would be an IXC or a cellular provider.

Typically, customers using telephones such as the telephones 1 make calls through the public switching telephone network (PSTN) 3. The PSTN provides switched connections between calling and called stations, supporting voice-grade communications between the stations. The parties may use the switched voice-grade connections for conversational speech. Today, many parties also use the telephone connections through the PSTN to communicate other information, e.g. data modulated onto carrier waves within the audio bandwidth of the telephone network.

The telephone calls may stay entirely within one carrier's network, for example when a party using PC $7_A$ calls the station $1_A$, both of which receive switched telephone service from the LEC network $3_1$. Some calls, however, interconnect between two carriers' networks. For example, a call from the PC $7_A$ to the ISP equipment $7_c$ would go first through the LEC network $3_1$ and then through the CLEC network $3_2$.

Some calls between two carriers' networks actually transit one or more other carriers' networks. In the illustrated example, the third carrier does not have a direct link into the CLEC's network $3_2$, and calls between the networks $3_2$ and $3_3$ must transit the LEC's network $3_1$. IXCs often have agreements with CLECs to bypass the LEC, and therefore will have direct network connections to the CLEC networks. However, a cellular carrier or another CLEC may not have such an arrangement with the CLEC network $3_2$. In such a case, the third carrier's network $3_2$ initiates and receives calls through the landline network via the LEC network 31, including calls to and from parties served through the CLEC network $3_2$.

Set-up and tear-down of a call connection traversing two switching offices of the PSTN requires an exchange of various signaling information between the two switching offices. Similarly, set-up and tear-down of a call connection traversing two carriers' networks requires an exchange of various signaling information between the offices communicating over the interface between the two networks. Some systems still utilize in-band signaling, within the voice channels on the interconnecting trunks. However, increasingly, the carriers utilize an out of band signaling technique commonly referred to as "Common Channel Signaling" or "Common Channel Interoffice Signaling" (CCIS).

In accord with the invention, certain monitoring equipment in one carrier's network, such as the LEC network 31, receives the signaling messages exchanged between that network and either or both of the other carriers' networks 32 and 33 and accumulates records 5 of the details of the calls. The call detail 5 for each call includes a wide variety of different items of information about the call. For example, the information may include calling and called party numbers, the time of the call, the duration of the call if completed, the type of release if terminated without completion, identification of office(s) serving the call within each network, etc. The monitoring equipment in the LEC network $3_1$ accumulates similar call detail records 5 for calls to and from data devices, such as calls from the personal computer (PC) $7_A$ to an ISP $7_C$.

The call details 5 are supplied through a database input procedure 50, referred to as a "landing zone" process. The landing zone process 50 serves to format the data and load the call details into appropriate tables in one or more relational databases 60. An example of appropriate database software is available from Oracle.

The landing zone or "LZ" process 50 manages the incoming CDR data streams, checking for errors and loading the data into the relational database tables. The LZ 50 buffers incoming records and periodically uploads the records into the tables. The records follow a first in, first out logic at the landing zone. If two types of call detail records are used, e.g. SS7 and AMA, the landing zone 50 may actually comprise two different LZ routines.

The relational database 60 stores the bulk detail data in an accessible form. However, still further processing is needed to allow analysis and output of the results in desired aggregate forms. Data from the relational database 60 is prepared and uploaded in process 70 for input for On-Line Analytical Processing (OLAP) 80. The preferred embodiment of the on-line analytical processing routine comprises a multi-dimensional database with a presentation layer. The presentation layer may be an independent program or an integral element incorporated in a software package with the multi-dimensional database. The presentation layer provides the user interface, for example in the form of a client-server interface or a web-browser interface. The presentation layer offers the user fast and flexible access to the study data.

The data preparation process 70 summarizes details of calls and categorizes calls into logical groupings. One other function of the data preparation 70 is categorizing calls into "bins" based on the time and duration of the calls.

The data preparation process 70 also may involve modifying each call detail record by application of reference data from other sources, such as profile or service information of one of the parties to the call. In this part of the data preparation operation for the interconnect traffic study, one specific purpose is to combine information from call detail records with external support system data. For the CLEC traffic study application, this operation might identify the end office switch in the LEC network that serves callers who originated calls to destinations served through the CLEC network. Preferably, this part of the preparation utilizes middleware that takes the form of a relatively universal system, with an interface to other data systems, whether it is for forecasting or for looking at marketing data, demographic data, etc.

The processed call detail information is uploaded to the OLAP 80. The OLAP process 80 runs over or more applications to analyze the prepared call details and compile data into reports, for output to a user's terminal 9. The OLAP process provides certain study management tools as well as the user interface. For example, the OLAP system 80 receives the inputs and presents outputs via the user terminal 9, to set up study models, to set-up specific studies using established models and to present study results. The preferred embodiment of the OLAP software is a multi-dimensional database (MDDB) with an integrated presentation layer.

The MDDB 80 captures and stores high level summary data and displays it through the user terminal 9 in a variety of ways. The MDDB enables the user to overlay multiple dimensions when viewing the data, for example, showing originating traffic from one area code generated during certain hours of the day with an average call holding time greater than a specified threshold. The preferred MDDB offers the manipulation of data in a cube concept, where data can be approached from many different directions, providing different slices or views of the data. The preferred MDDB also uses a "drilling down" feature to slice or roll-up (aggregate) data based on the metrics (Minutes of Use, Average Holding Time, Busy Hour identification, etc.) required. The drill-down feature enables the user to access the raw call detail information, when necessary. As one example of drill-down, having found an ISP $7_C$ served through the CLEC network $3_2$, a user might drill-down into the call details to identify originating offices within the LEC network $3_1$ for calls to that ISP or even telephone numbers of subscribers calling that ISP. Such a drill-down analysis might enable the LEC engineer to design and deploy new network equipment to relieve congestion caused by such Internet access traffic.

The application running on the MDDB may also provide another point at which the user may access external reference data. For example, having found candidate numbers for ISPs, the application may compare the numbers to those of known ISPs, and reduce the list to a list of new ISP numbers within the CLEC's domain.

The MDDB allows export of data, e.g. to copy a particular presentation from the MDDB into a spreadsheet such as into Excel. The user can then do his own analysis in Excel.

At a higher level, the MDDB enables presentation of aggregate traffic pattern data. For example, it is possible to display the Internet traffic as a percentage of all traffic to a particular CLEC, either based on peg count or usage (e.g. MOU or CCS).

Multi-dimensional database software providing these capabilities is available from Gentia Software, Inc. of Wakefield Massachusetts under the product name of Gentia DB. The Gentia DB is a fully OLAP-compliant multidimensional database. Similar to Essbase, it is loaded with data derived from various company data sources, and is pre-consolidated. Gentia supports an "unlimited" number of dimensions, as well as multiple hierarchies within a dimension. It is a fully object oriented visual development environment, with a library of predefined objects, and provides an OLAP database with tools for loading, analysis, querying, and reporting.

Gentia runs on multiple platforms and is scalable across a large system. The multi-dimensional database program could run on a server, and the relational database 60 might run on a separate server. Alternatively, two or more of these databases may run within one computer system or server. The server running the multi-dimensional database (MDDB) 80 is accessed by multiple user work stations 9. Although the system may implement a client-server interface, preferably, the database 80 provides a web suite for a user interface, enabling access using standard browser software in the workstations. The actual server may connect directly to the terminals 9 or communicate therewith through a data network, such as a private LAN or WAN or the Internet.

Logically, the data preparation software 70 runs as a separate (e.g. Oracle) relational database. The MDDB is platform independent and may run in the same server as the relational database or in a separate server. The data preparation software accesses records from each relational database and uploads data to the MDDB. The MDDB processes data from those records to generate the analytical tables, reports and graphs.

The web suite software together with the MDDB software performs all necessary OLAP processing. As part of this function, the software implements a Data Collection and Study Management Tool set, which enables the user to set up and control studies using the traffic track system and run applications to obtain the analytical results. The detailed description of the MDDB operations and this Tool set from the above cited U.S. patent application Ser. No. 09/188,713 copending case is incorporated herein by reference.

The present invention provides effective monitoring of various systems and carriers' portions of a public telephone network and processing of the data derived from such monitoring, to enable analysis of various patterns of the traffic across the interface between carriers' networks. The monitoring and analysis may utilize automatically generated accounting (AMA) messages. In the preferred embodiments, the monitoring involves capture of interoffice signaling messages relating to interoffice telephone calls interconnected between the two carriers' networks.

In the case of CLEC interconnect traffic every call made is interoffice, so that one hundred percent of PSTN/CLEC calls may be monitored using the interoffice signaling. The invention preferably involves monitoring of the interoffice signaling involved in processing calls passing between the LEC and the CLEC. The interoffice signaling theoretically could be in-band signaling, but preferably, involves out-of-band signaling, i.e. some form of common channel signaling. In the preferred embodiments, the interoffice signaling takes the form of a signaling system seven (SS7) compliant common channel interoffice signaling network. The SS7 signaling extends through and between both carriers' networks.

To facilitate understanding of these preferred embodiments of the invention, it may be helpful at this point to review the structure and operation of the telephone network, in somewhat more detail.

Figure 2:
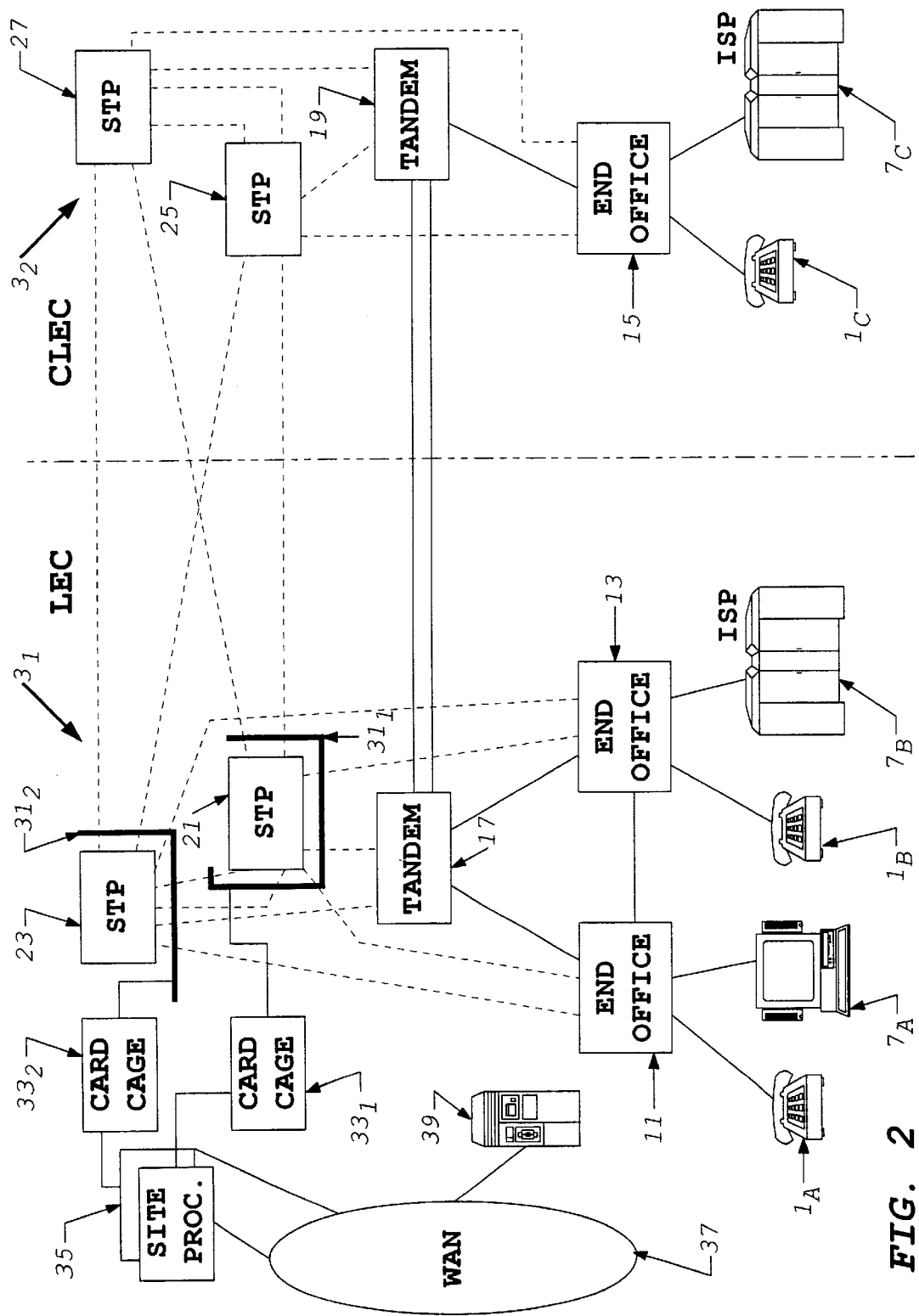
FIG. 2 is a block diagram illustrating a switched telephone network and elements used to capture and analyze call data from that network to implement traffic analysis applications.

Referring to FIG. 2 there is shown a block diagram of a public switching telephone network and the SS7 network that carries the call control signaling for the switched network. The PSTN comprises networks operated by many carriers. The invention enables monitoring and analysis of interconnect traffic across the interfaces between networks of different carriers. Persons skilled in the art will recognize that the traffic tracking may apply to any such interconnect traffic. For purposes of discussion of FIG. 2, it is assumed that the interconnect traffic crosses the interface between two carriers' networks, specifically between a LEC network $3_1$ and a CLEC network $3_2$.

The switched portion of telephone network consists of a series of central office (CO) switches, which are conventionally referred to as signaling points (SPs) in reference to the SS7 network or as service switching points (SSPs) in reference to an intelligent version of the PSTN. Certain of these SPs comprise end offices (EOs) illustrated at 11, 13 and 15 in the drawing. Other SPs serve as tandem offices, illustrated for example at 17 and 19 in this drawing.

Customers' telephone equipment connects through telephone lines or other links to the end offices. Examples of such equipment include normal telephone stations shown at $1_A$, $1_B$ and $1_C$ as well as various data devices such as the PC and ISP hardware shown at $7_A$, $7_B$ and $7_C$.

Each office serving as a signaling point has a point code comprising a 9-digit code assigned to every node in the signaling network. Messages communicated via the SS7 signaling network utilize the codes to identify source and destination SPs, and the traffic tracking system can use these point codes to identify messages relating to traffic through particular offices.

The end offices 11 and 12 represent end offices in the region of one operating company or LEC, whereas the end office 15 represents one of the end offices in the region of a different operating company, in this case a CLEC. Each operating company or carrier has its own network or "member" ID, which is used as the first three digits of the point codes of the SPs of that carrier's network.

Also, each end office resides within an area assigned NPA digits as an area code. Each exchange is identified by one or more three-digit codes, referred to as NXX digits. Each such code corresponds to the NXX digits of an NXX-XXXX (seven-digit) telephone number or the three digits following the three area code digits (NPA) in a ten-digit telephone number. Origination and destination telephone numbers appear in various SS7 signaling messages and various records that the offices create for billing and the like. As a result, the NPA-NXX digits of those telephone numbers also can serve as identifiers of the serving end offices.

Digital trunk circuits, shown as solid lines, interconnect the switching offices of each network 3. Typically, within one carrier's network $3_1$ end offices, such as end offices 11 and 13, are directly interconnected by trunk circuits. For overflow traffic and/or for connections to other carrier networks, the offices 11 and 13 also connect via trunk circuits to a tandem office 17. In the CLEC network $3_2$, the end office 15 connects through a trunk circuit to a tandem 19 or direct to an end office. The LEC and CLEC networks $3_1$, $3_2$ interconnect through trunk circuits shown for example between the tandems 17 and 19, although end office interconnections are possible.

The preferred embodiment of the present invention relies on monitoring of interoffice signaling messages. To understand the monitoring functions it may be helpful to review the interoffice signaling functions of the network.

The SS7 type interoffice signaling network comprises a series of Signal Transfer Points (STPs) shown here at 21, 23, 25 and 27 and interconnecting data links indicated by dotted lines. Each STP in a network connects to the SP or SSP capable offices in that network via A links. Thus, in the LEC network $3_1$, the end offices 11, 13 and the tandem 17 connect to the STPs 21, 23 through A links. Similarly, the end office 15 and the tandem 19, in the CLEC network $3_2$, connect to the STPs 25, 27 via A links.

Within the LEC network $3_1$, the STPs 21 and 23 constitute a mated pair of STPs connected to each other via C links. Within the CLEC network $3_2$, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area. Also, although the STPs appear within one local carrier's network, the CLEC may actually use STPs provided by some other carrier. For example, some CLECs contract with an IXC, such as AT&T, to provide the STP service for the CLEC's network. The STPs provided by the IXC continue to perform the packet switching functions for interoffice signaling for the IXC's own network.

The STP 21 connects to the STP 25 via a B link, and the STP 21 connects to the STP 27 via a D link. Similarly, the STP 23 connects to the STP 27 through a B link, and the STP 23 connects and to the STP 25 through another D link. As will be understood, the A,. B, C and D links are physically identical links. The letter designations for these various links relate to cost in terms of ease of access.

The STPs in any mated pair have the same translations. Thus, the translations in STP 21 are the same as the translations in STP 23, and the translations in STP 25 are the same as the translations in STP 27. The translations control the message routing through the STP.

The STPs may connect to transactional database systems, such as Service Control Points, Integrated Service Control Points or the like. Such database systems, for example, provide call control information for a wide range of recently developed enhanced features. Other database systems, such as the Line Identification Database (LIDB) provide information for ancillary purposes, for example, for credit card validation, for enhanced versions of Caller ID, etc. The monitoring in accord with the traffic track invention captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 2.

The present invention preferably conducts interconnect traffic studies based on capture and processing of the common channel interoffice signaling (CCIS) messages exchanged between offices, during otherwise normal call processing, typically implemented in the signaling system seven (SS7) protocol. For SS7, typical application layer protocols include Transaction Capability Application Part (TCAP) Operations, Maintenance, Application Part (OMAP), and ISDN User Part (ISDN-UP or ISUP). TCAP provides the signaling protocols for exchange of non-circuit related, transaction-based information, typically for accessing databases such as service control points. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP".

ISDN-UP specifies the procedures and message protocols for setting up and tearing down trunk connections for calls utilizing common channel interoffice signaling (CCIS). ISDN-UP messages, for example, include an Initial Address Message (IAM), an Address Complete Message (ACM) an Answer Message (ANM), a Release Message (REL), and a Release Complete Message (RLC).

The lower three layers of the SS7 protocol, the network layer, the signaling link layer and the data link layer, form the Message Transfer Part (MTP) of SS7, for the TCAP, OMAP and ISDN-UP protocols. The MTP is common to messages for all applications and provides reliable transfer of signaling messages between network nodes. The MTP relays messages between applications running at different nodes of the network, effectively like a datagram type service.

Figures 3, 4:
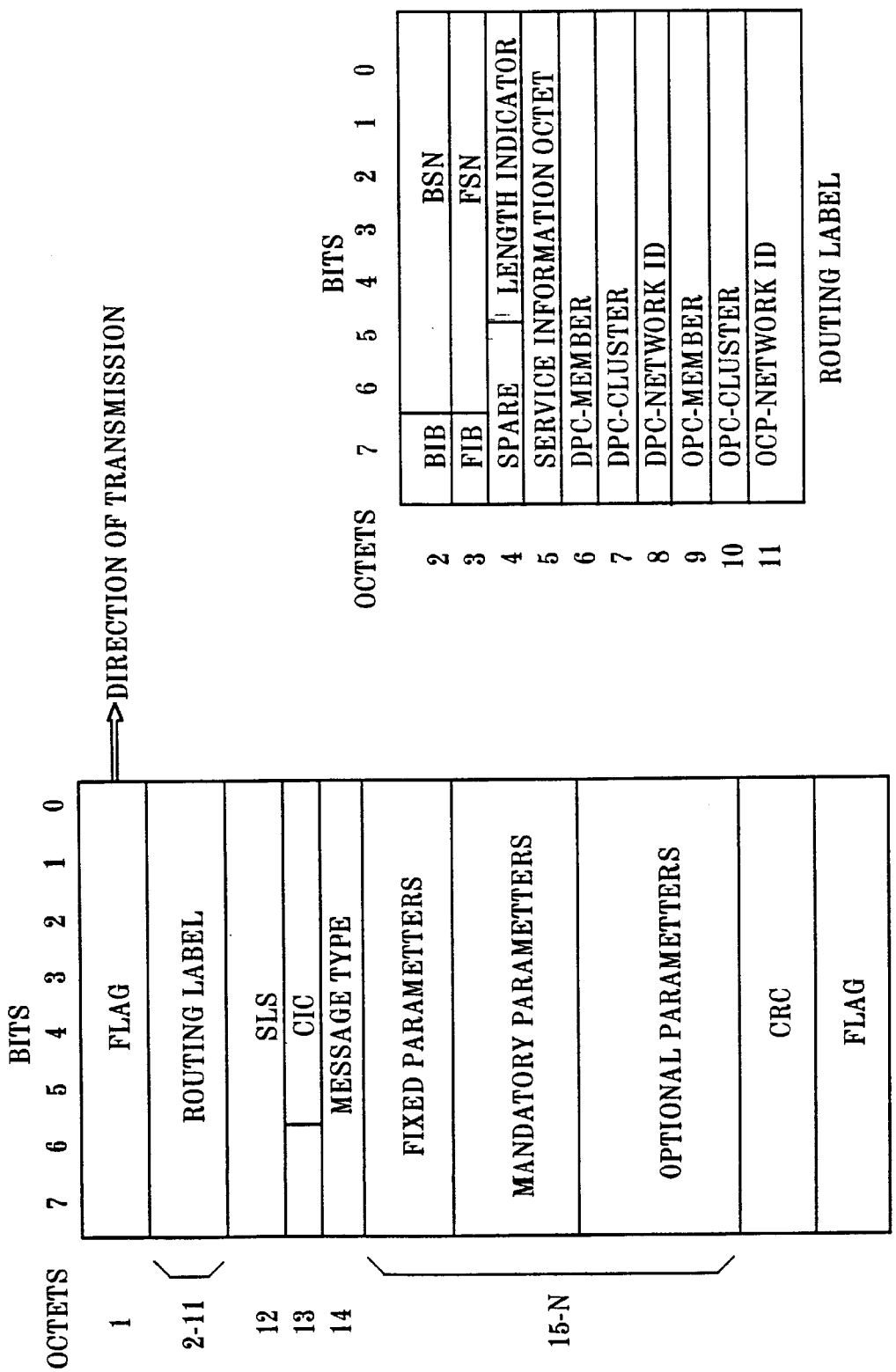
FIG. 3 illustrates in graphic form the layout of an SS7 protocol interoffice signaling message.
FIG. 4 graphically depicts the layout of the routing label portion of the SS7 message of FIG. 3.

The SS7 messages comprise digital serial messages sent to an STP for routing. FIG. 3 provides a graphic illustration of an SS7 message packet. The message is arranged in 8 bit bytes or octets. The message includes octets representing a start flag, a routing label for -MTP processing and certain specialized indicators. Examples of such indicators include a Signaling Link Selection code (SLC), a Carrier Identification Code (CIC) and a message type indicator. Octets 15–N carry the information of the message in the form of fixed, mandatory and optional parameters. The lengths of the mandatory parameters field and the optional parameters field are variable. The message ends with an octet for a cyclic redundancy code for error correction, which typically is followed by the flag at the beginning of the next message.

For purposes of the MTP processing, each SS7 message includes the routing label in octets 2–11. Several of the traffic tracking studies rely on translation and/or analysis of certain addressing information from the SS7 messages, for example to identify originating offices for calls terminated in the CLEC network $3_2$. The addressing information used for the MTP and for the traffic analysis appears in the routing label.

FIG. 4 is a graphic illustration of the routing label of the SS7 message packet. The routing label includes a series of indicators, a service information octet and fields for both destination related addressing and point of origin addressing.

Octet 5 is the service information octet. This byte indicates the type of service information, for example by inclusion of a code for a Message Signaling Unit (MSU).

The origination or 'calling party' address for the SS7 packet message itself includes octets 9, 10 and 11. These 'calling party' address octets carry origination point code (OPC) information, for example member, cluster and network ID information, for the node on the SS7 network sending the message.

The destination or 'called party' address for the SS7 packet message itself includes octets 6, 7 and 8. These three octets carry destination point code (DPC) information for example member, cluster and network ID information, for the node on the SS7 network targeted to receive the message.

In operation, the translation tables stored in an STP cause the STP to actually route based on the DPC without translating any of the DPC octets into new values. The called party address octets (6–8), however, may carry other types of called party addressing information and receive different treatment by the STP, such as a global title (GTT) and subsystem number (SSN) information. The STP examines a message signaling MSU type indicator in each message to determine if there is a need for translation, e.g. from GTT to DPC, before routing the message.

In both the DPC and OPC, the member number corresponds to the carrier's network. In the example of FIG. 2, the SP capable offices 11, 13 and 17 of the LEC network $3_1$ all would utilize the same unique member number. The SP capable offices 15 and 19 of the CLEC network $3_2$ all would utilize the same member number, but that number would be unique and different from the member number used in the LEC network $3_1$. As discussed more later, one feature of the CLEC traffic analysis involves translations of data from the SS7 messages into descriptive textual information, for example, to translate the member number of one or more CLECs into the name(s) of the CLEC(s).

The SS7 network constitutes a highly redundant data network, generally using 56K switched data circuits for the various links to and between the STPs. Because of the redundancy, different signaling messages for a given call, may actually transit different routes through the SS7 network.

An SS7 monitoring system may be implemented on any carrier's portion of the PSTN. In the example illustrated in FIG. 2, the LEC network 3 uses the monitoring and call detail compilation equipment, for the traffic tracking in accord with the present invention. According to the invention the LEC portion of the public switching telephone network (PSTN) is provided with a traffic monitoring and analyzing system comprising monitors 31, card cages 33 and one or more site processors or servers 35, of the type described in detail in the above discussed Pester Patent. One commercial implementation of such an SS7 monitoring system is currently available from Hewlett Packard, under the product name "AcceSS7".

In the case of a CLEC every call made is an interoffice call, so that one hundred percent of PSTN/CLEC calls may be recorded through monitoring of the SS7 signaling. To analyze the traffic to the CLEC network $3_2$, the monitoring takes place on the B and D links between the STP pairs 21, 23 and 25, 27. In each case the monitoring and analysis is completely transparent to the trunk circuits and the customers. However the traffic which is being investigated and monitored is the traffic on the trunks. That is, while the signaling traffic is being monitored it is not the signaling traffic itself that is a matter of concern.

FIG. 2 shows the sets of monitors or interfaces 311, 312 to the SS7 links to the STPs 21, 23 in diagrammatic form, as solid bold lines across respective links. A card cage 331 connects the monitors 31, to a site processor 35. Similarly, a card cage 332 connects the monitors 312 to the same or another site processor 35. The monitors 31 may be conductively or non-conductively coupled to the links to serve as passive interfaces. Alternatively, the monitors 31 may comprise active traps. The card cages 33 connect the monitors 31 to the site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated for traffic tracking and analysis. For simplicity and clarity, however, only a single system is here illustrated.

The SS7 signaling in a completed call typically includes an Initial Address, Message (IAM), an Answer Complete Message (ACM), an Answer Message (ANM), a Release Message (REL) and a Release Complete Message (RLC). Since the common channel signaling system is intentionally redundant, the messages in a related set may be routed over different A links.

Consider first a simple example of a call within the LEC network $3_1$. On a call from PC $7_A$ to ISP equipment $7_B$, the IAM may go through STP 21, whereas the ACM and ANM may just happen to go through the STP 23. The REL and RCL messages also may use different links and/or different STPs. It is therefore necessary to monitor an appropriate set of links and to reassemble the signaling pertaining to a desired transaction or signaling message set such as for a single call, to provide one call detail record or CDR. This is accomplished in the site processor 35 in a known manner as described in the Pester or Brockman et al. Patents.

It should be noted that the PSTN conducts signaling on all interoffice calls, and the monitoring system can trap messages and compile CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets the site processor 35 has the data to show the called and calling stations $7_A$, $7_B$, the start time and elapsed time of the call if completed, the originating office, the terminating office, the cause of release if a call is not completed and various other detailed data. By monitoring the SS7 signaling for all of the calls originating in, terminating in or passing through a designated switch, such as the tandem switch 17, it is possible to analyze the traffic to and from the CLEC to identify particularly significant patterns.

For example, based on a pattern of calls through the tandem 17 to a certain number, it is possible to identify the number of an ISP 7C, even though that ISP is served through the CLEC switch 15. Knowing that number, it is possible to gather all of the desired information about calls going to the ISP 7C via an interswitch path, including the numbers of calling customers and the number of calls or minutes of use of such calls by each customer. Conversely, knowing the number of ISP $7_B$, it is possible to collect numbers of callers to that ISP, including numbers of callers receiving service from the CLEC network $3_2$.

The assemblage of the raw call detail data desired for a particular purpose occurs at the site processor level. One or more site processors 35 accumulate the CDRs for the traffic monitoring application of the present invention. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a server system 39 running a relational database 60 (FIG. 1) for the accumulated SS7 data.

The server system 39 comprises one or more computer systems coupled for communication over the WAN 37. The computer(s) of the server system 39 run software implementing the landing zone process 50, the relational database 60, the data preparation operation 70 and the OLAP 80. One or more computers in the server system 39 also provide communications between the OLAP program 80 and the user terminals 9, to enable the users to set-up and manage specific studies and to access results.

The CDR compilation and forwarding routine in the site processor 35 executes a special procedure for long duration calls. If a call is in progress at the point in time for its programmed uploading to the relational database 60, say midnight, the site processor 35 creates a "call-in-progress" CDR, indicating the start time and duration of the call to that point. Later, when the call ends, the site processor creates another CDR as if the call started at the point in time (midnight) and lasted for the remaining duration of the call from that time until release.

It will be understood that some calls are completed through a single switch, such as a call from a PC (not shown) associated with the telephone 1B through the end office switch 13 to ISP 7B. Such intra-office calls will not generate the above discussed SS7 signaling and thus will not be reflected in the CDRs developed from such signaling. If a particular study requires tracking of such intra-switch calls, for example if a CLEC connects directly to a port of the end office switch, the invention may also utilize data accumulated from certain switch messages normally utilized for billing and other accounting purposes. A more detailed discussion of using automated message accounting (AMA) records as a secondary source of the CDR data appears in commonly assigned copending application Ser. No. 09/188,712 entitled "TRAFFIC TRACK USAGE MEASUREMENT SYSTEM" and that description is incorporated herein by reference.

The SS7 network constitutes a highly redundant data network, generally using 56K switched data circuits for the various links to and between the STPs. Because of the redundancy, different signaling messages for a given call may actually transit different routes through the SS7 network. The monitoring system is set for a given study to capture all signaling messages regarding traffic of interest for purposes of the particular type of study application.

Returning to FIG. 2, consider a study of ISP traffic as a first simple example. The intent is to capture all of the SS7 signaling messages relating to each call to an ISP. Now assume that a user places an Internet access call from the PC $7_A$ to the ISP equipment $7_B$ The user at PC $7_A$ activates the appropriate software routine to initiate dialing of the main number of a hunt group connected from end office 13 to the ISP equipment $7_B$. The SP end office 11 generates an Initial Address Message (IAM) with a destination point code for the end office 13 and an originating point code of the end office 11. The IAM includes a variety of information needed for call set-up, including the dialed number. The end office 11 sends the IAM either to STP 21 or to STP 23. That STP examines the address information and its translations and routes the message offer the next appropriate link, in this case over the A link to the end office 13.

In response to the IAM message, the end office 13 determines whether or not one of the lines in the hunt group corresponding to the dialed number is available. If at least one of the lines is available (not busy) the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. Again, the STP receiving the message examines the addresses and uses its translations to forward the message over another link to the appropriate destination, in this case the end office 11.

The end office 11 sends ringback tone over the line to the modem in the calling PC $7_A$ At about this time, the end office $7_B$ applies a ringing signal to the line to the called station $7_B$. If the PC $7_A$ provides audio output, the calling party may hear a ringback tone, and the caller and her data equipment await an answer.

The ISP equipment $7_B$ detects the ringing signal, and if operative, that equipment establishes an off-hook condition on the line to answer the incoming call. The end office 13 detects this new condition as an answer and interrupts the ringing signal on that line. The end office 13 also sends an Answer Message (ANS) back through the SS7 network to the end office 11, indicating that the called station $7_B$ has answered.

At that time the necessary trunk circuits between l the end offices are connected together and assigned to the call. The trunk connection may run through the tandem 17, which would require separate call set-up and signaling for each leg of the call to and from the tandem. In this simplified example, assume that the trunk connection extends directly between the end offices. The end office 11 connects the line for the PC $7_A$ to the trunk circuit, and the end office 13 connects the line for the ISP equipment $7_B$ to the trunk circuit. At this point a complete voice-grade telephone connection exists between the two data devices, and the data devices can exchange modulated audio signals carrying various data between the user on PC $7_A$ and the Internet accessed through equipment $7_B$. Hours later, when one of the parties terminates the session, the offices 11, 13 exchange REL and RLC messages via either of the STPs 21, 23 as part of the procedure for tearing down the call connection over the trunk circuit.

To capture all of the interoffice signaling messages relating to the call, the card cages 33 are set so that the monitors 31 capture A-link signaling messages to and from one or both of the offices 11, 13. For a study of overflow interoffice traffic through the tandem, the card cages 33 are set so that the monitors 31 capture A-link signaling messages going to and from the tandem 17. For the exemplary call, the site processor 35 compiles a CDR from the complete set of SS7 messages relating to that call.

Calls crossing the interface between the LEC network $3_1$ and the CLEC network $3_2$ go through the tandems 17 and 19. Typically, this requires a leg through the originating office to the tandem of the originating carrier, a leg between the tandems and a leg from the tandem of the terminating carrier through an end office of that carrier to the destination station. For example, if the user at PC $7_A$ now calls the ISP $7_C$, the first leg of the call extends to the tandem 17. The second leg extends between the tandems 17 and 19, and the final leg extends from the CLEC tandem 19 through the end office 15. Calls to and from other carriers' networks that use the LEC network $3_1$ to access the CLEC network $3_2$ would include similar legs, particularly the leg between the tandems 17, 19. Each leg of any such call entails interoffice signaling similar to that discussed in our first example of a simple intra-carrier call between $7_A$ and $7_B$. It would be possible to capture A link signaling messages of the end offices. However, it is preferred to capture B and D link signaling messages on the leg of the call between the tandems, i.e. across the actual interface between the two carriers' networks.

For this purpose, the LEC can configure remotely on the B and D links from the LEC's STP pair 21, 23 to the STP pair 25, 27 serving the CLEC. Specifically, the study management application running in the OLAP 80 (FIG. 1) remotely accesses the site processor 35 to configure on the B and D links and specify a study period for collecting all the records on those links. Depending on the intent of the study, the management application may instruct the site processor to capture messages relating either to calls originating in the LEC network, calls terminating in the LEC network or both.

Figure 5:
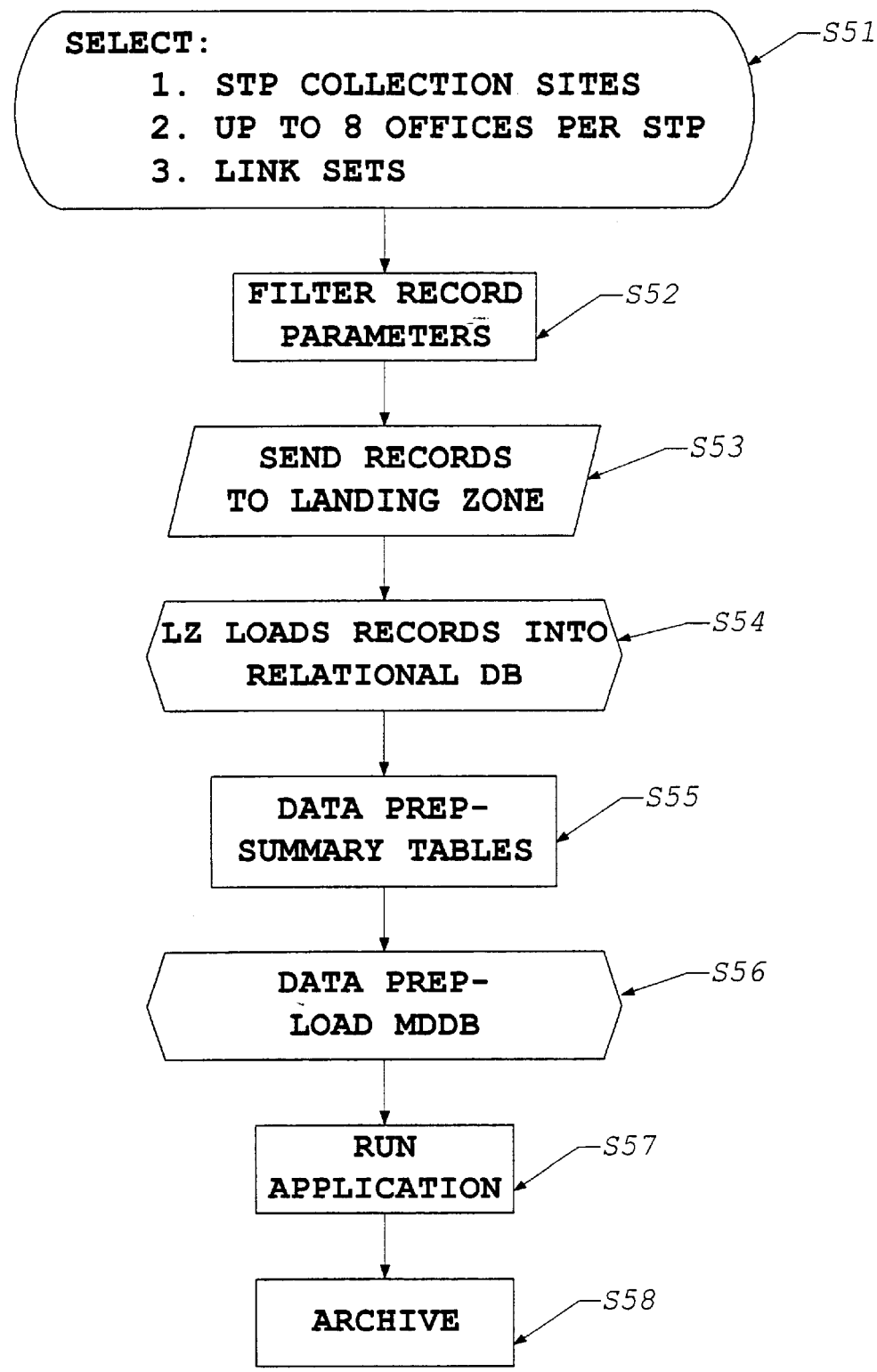
FIG. 5 is a flow chart illustrating the high-level process of overall management of a traffic track study, such as a CLEC traffic study.

FIG. 5 is a flow chart depicting the overall flow of study management. This study process flow applies to any type of study conducted through the traffic track system, including management of interconnect traffic studies of CLECs and the like. As shown at step S51, the process essentially begins with the user inputting a number of study selections. Consider a study based on monitoring of interoffice signaling, for example to study interconnect traffic to and from the CLEC network $3_2$. Such a study would involve input of the three selections, the signal transfer point (STP) collection sites, a number of offices associated with each STP (up to 8 per STP) and the link sets to be monitored. In the CLEC study example, this preferably sets the system to monitor the B and D links between the two STP pairs 21, 23 and 25, 27.

The network elements monitor the records, and filter the records by parameters (S52), based on the input selections. For the CLEC study, the site processor will compile the CDRs for calls over the trunks between the tandems 17, 19, i.e. the calls interconnected between the networks $3_1$, $3_2$. In step S53, the monitoring equipment transmits the records (CDRs) to the landing zone 50. The landing zone process 50 loads the records into the tables for this study established in the appropriate relational database 60 (step S54).

A two-dimensional database record such as a CDR is just a flat file. A two-dimensional database has individual tables, created for a given collection. The relational database 60, for example for interoffice signaling records, stores Call Detail Records (CDRs) for millions of calls relating to a particular traffic study. In a study for traffic to and from the CLEC, the table would contain CDRs compiled from the SS7 messages on the B and D links between the STP pairs. The landing zone process 50 for the SS7 records takes all of those Call Detail Records and loads them into one or more tables set up for the exemplary study. Such a table includes every Call Detail Record and every dimension or piece of information within the individual Call Detail Records in a linear form. As a result of the landing zone processing 50, there is a table, within the table there is CDR 1, CDR 2, etc., and within each CDR there are X dimensions for the X different items of information within each CDR.

In the relational database 60, the call detail records include study identifiers and a study "type" flag. The identifiers can be used to identify the particular studies to which the records relate. The study type flag indicates the general type of the particular study, e.g. tandem, Internet, CLEC, etc. Preferably, the software running in the site processor(s) 35 adds the study identifiers and the study "type" flags to the call detail records before supplying the records through the landing zone procedure 50 to the relational database 60.

The data preparation routine 70 prepares a staging table and possibly one or more summary tables (S55). This involves various translations using reference data, the binning or spreading of records to properly allocate usage time and the loading of data into the appropriate tables. The staging table includes all of the CDRs, as enriched in the data preparation stage. A summary table contains summary information accumulated from the enriched CDRS. The data preparation routine 70 loads the tables into the MDDB 81 (S56).

Within the MDDB software, a study application is run to present the data to the user (S57). The study application corresponds to the particular type of study, e.g. tandem, Internet heavy user finder, ISP finder, etc. In our example, the study application relates to one of several types of study of interconnect traffic interconnected to or from a CLEC. The study results also are archived (S58) for future reference. If necessary for the particular study, e.g. for CLEC billing reconciliation, the archiving may include the original record data from the relational databases.

Although not shown, upon completion of the particular study, the application running on the MDDB may enable the user to access other data. For example, in an application which identifies end user telephone numbers, such as an ISP finder application or an Internet user finder application, such other data sources might provide the name and address of each identified user. This might enable the LEC to market certain services to the identified parties, for example to market the LEC's new ADSL services to high end caller's to the ISP $7_C$ served through the CLEC network $3_2$ and/or to market T1 or higher rate services to the ISP served by the CLEC. Examples of such other databases 83 include CRIS, LMOS and LIDB (Line Identification DataBase).

Figure 6:
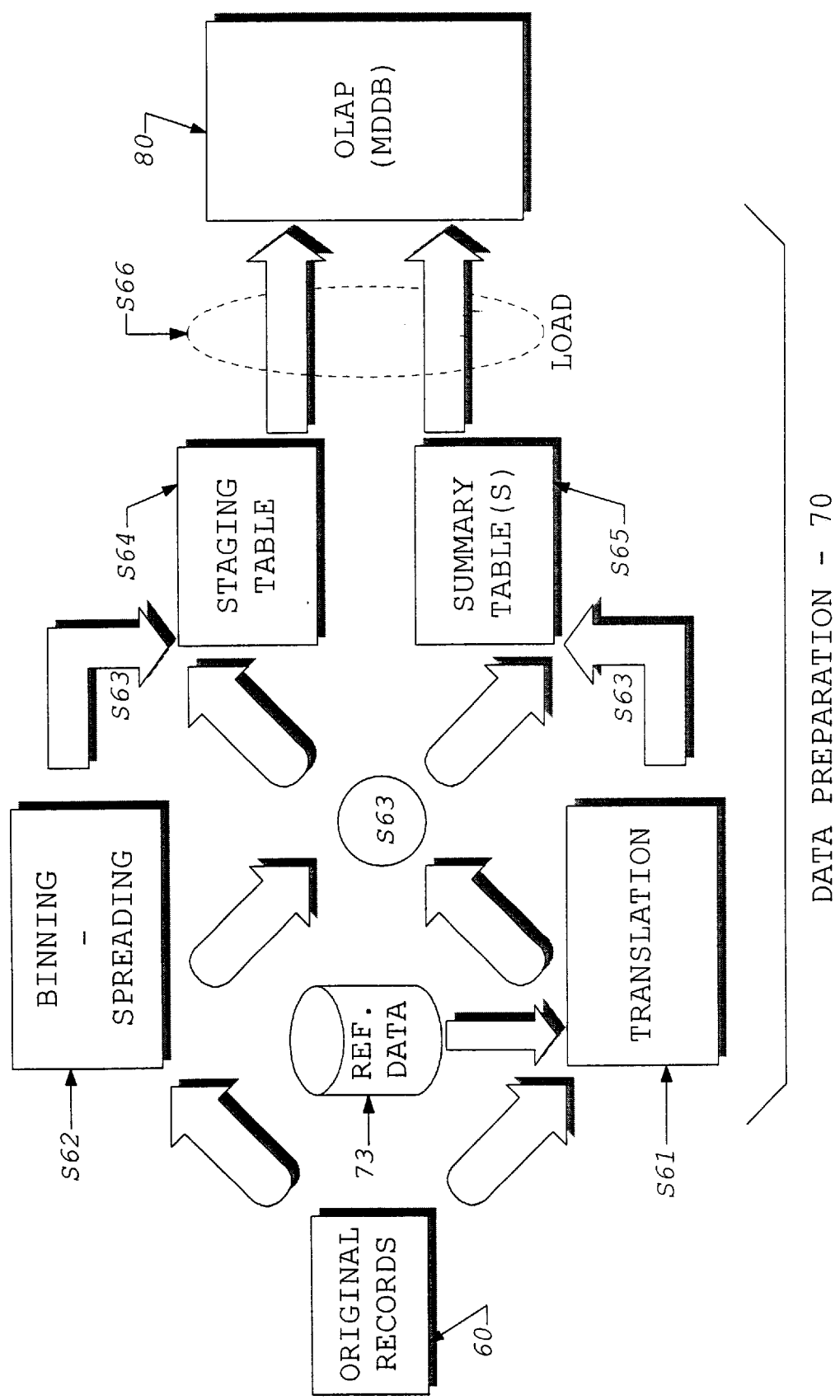
FIG. 6 is a flow chart useful in explaining the operations involved in data preparation in the traffic track system.

FIG. 6 is a high-level process flow diagram depicting the operation of the data preparation routine 70. As noted, data preparation involves essentially three major functions, data translation, binning and assignment of records to tables.

In step S61, the original records from the relational database 60, preferably CDRs compiled from monitoring of interoffice signaling messages, can be translated using external reference data (73). Typically, the reference data 73 provides a translation of the data elements from a raw form to some more useful form. For example, in this process, the software may take the OPC or DPC address information from the interoffice signaling messages or the NPA-NXX digits from telephone numbers included in the records and access associated reference data 73. The reference data would provide translations of the record information into the common language location identifier (CLLI) codes for identification of the serving switches. In this way, the enhanced records would provide descriptive identification of the switch serving the caller and/or the switch serving the called party for each recorded call.

The data preparation program 70 also executes an algorithm for binning or spreading of usage data from the records, to properly allocate usage that may extend over multiple hours to the appropriate hourly time periods (S62). For engineering purposes, it is important to know traffic loads by hours, particularly to identify typical peak busy hours and determine loads during such hours. Categorizing calls and CDRs by hours is significant here because CDRs often relate to calls that can span hours. For these reasons, a significant operation of the data preparation process is to make sure that the calls are binned into the hours of the actual usage.

For example, an Internet access call might start from PC 7A to ISP 7C at 8:15PM and last until release at 10:20PM. As such, the start-time hour would be the hour from 8 to 9 PM, but all of the minutes of use for the call should not appear to in that one hour. The binning process allocates 45 minutes of use in the 8 to 9 o'clock hour, 60 minutes in the 9 to 10 o'clock hour, and then 20 minutes in the 10 to 11 o'clock hour. To achieve this accurate binning of calls from the CDRs, the data preparation operation goes through every single CDR, examines the start time and duration and applies minutes of usage into the correct hour of the day.

The binned results enable the LEC personnel to analyze traffic by hours, for example to identify the peak busy hour for a CLEC and to identify the peak busy hour for Internet access traffic into that CLEC's network. Identification of ISP numbers together with a correlation of the CLEC busy hour to the ISP busy hour would indicate that the CLEC is heavily marketing services to ISPs.

At step S63 (shown as multiple transfer arrows) the enhanced records resulting from the translation (S61) and the binning (S62) are compiled into one or more predefined tables, by application type. In the illustrated embodiment, the data preparation program 71 generates a staging table (S64) and one or more summary tables (S65). The staging table contains the complete enriched record information, whereas a summary table contains a more limited set of information to provide a desired summary of certain aspects of the traffic. For example, for the CDRs formed from monitoring of SS7 interoffice signaling, the staging table is the primary table used for binning all of the calls. The binned results also are forwarded to a second table or to a third table for summaries prior to input into the Gentia implementation of the MDDB 80. Other commonly used SS7 CDR summary tables include an "Office_Pair" table for tandem studies and CLEC studies and an "Office_Summary" table for end office studies.

At step S66, the data preparation routine 70 uploads the resulting tables into the OLAP program, in the preferred embodiment, the MDDB 81.

A more detailed description of the major functions of the data preparation procedure may be found in commonly assigned application Ser. No. 09/188,713 entitled DATA PREPARATION FOR TRAFFIC TRACK USAGE MEASUREMENT, and the detailed disclosure of that procedure from that application is entirely incorporated hereinby reference.

The data preparation routine may be written in PL/SQL language. The data preparation routine 70 preferably runs on the same computer that maintains the relational database and effectively runs on top of the relational database application 60. The data preparation process 70 accesses additional reference data 73 that may reside in the same or a separate computer system.

The data preparation function is an automatic process. Although there are some common aspects for all studies, data preparation preferably is adapted to different types of studies.

To enable the automatic data preparation function, as part of the initial set-up of a study, the CDR data from particular sources is pointed at the appropriate data preparation function based on the study-type flag in each CDR. In a CLEC study of traffic over the interface between the tandems, for example, the data captured by the SS7 monitors 31 and the site processor 35 goes through the CLEC traffic analysis version of the data preparation process 70.

Each study runs for some pre-determined period of time selected by the user. The results, however, are available in real or near real-time. The post collection processing could take several days or a week, depending on available processing power. Preferably, results will be available overnight. For example, if a user sets up a study on ISP traffic into the CLEC network $3_2$ for Sep. 10, 1998, the study begins at midnight, data is uploaded to the server system 39 periodically for the 24-hour period on that date. The SS7 data records are collected into the landing zone 50 at midnight and uploaded into the relational database 60. Then the data preparation 70 for the new CDRs begins at one o'clock (AM) the next morning and finishes loading into the MDDB 80 about four o'clock (AM). The results of the study are available to the user at the beginning of the next business day, e.g. nine AM Sep. 11, 1998. For a study over a longer period of time, e.g. a month long study for CLEC billing purposes, the user can access the latest results each morning.

A CLEC study for accounting purposes typically runs continuously in one-month cycles set up to match the particular CLEC's billing cycle. As noted, intermediate results are available daily. Other studies regarding CLECs, for example to identify ISPs served by the CLECs can run for shorter times, for example, for one to three days.

Consider now the execution of the study management process, specifically for a study of interconnect traffic between the networks $3_1$, $3_2$. As noted earlier, for a CLEC study, the LEC user can configure the monitors 31 and the card cages 33 remotely on the B and D links from the LEC's STP pair 21, 23 to the STP pair 25, 27 serving the CLEC. Depending on the intent of the study, the management application may instruct the site processor to execute a filter operation so as to cull out those CDRs relating either to calls originating in the LEC network or calls terminating in the LEC network or both.

In operation, the monitors and card cages supply the messages from the designated B and D links to the site processor 35. The site processor 35 in turn performs the selected filtering operation. The site processor 35 transmits the CDRs through the WAN 37 to the server system 39. In the server system 39, the landing zone 50 loads the CDRs for this study into the appropriate table in the relational database 60.

As discussed above relative to FIG. 4, every message transmitted across the SS7 common channel interoffice signaling network includes a routing label containing both origination and destination address information. Specifically, the routing label includes a destination point code and an originating point code. Each signaling point (SP) on the SS7 network has a point code address, comprising a 9-digit point code. The 9-digit code is the originating point code, for all messages that the SP sends, and the 9-digit code is the destination point code for all SS7 messages sent to the SP. Each operating company has its own network ID, which serves as the first three digits (member number) of the point codes of the SPs of that carrier's network. The origination point code is one of the dimensions or fields in a Call Detail Record. Another dimension relates to the destination point code.

Once the relevant CDR data is in the relational database 60, it is possible to write programs against the relational database. In accord with the invention, one particular application extracts all the records for calls terminating within the CLEC network $3_2$ that did not have an originating point code for an originating office that is within the LEC network $3_1$. Such records have originating point codes corresponding to other carriers, and as such they relate to calls that originated with other carriers' networks. The other carriers, not the LEC, may owe terminating charges to the CLEC. The LEC, however, can identify specific calls that it must pay for and specific calls that it need not pay for.

As part of the business arrangements between local carriers it is necessary to accurately perform jurisdictional calling factor calculations, such as Percent Interstate Use/Percent Local Use (PIU/PLU) calculations. In the CLEC case, these calculations are used to determine the relationship between interstate and local usage to define the access charges billed to Interexchange Carriers (IXCs) and reciprocal compensation between the LEC and the CLECs. Typically, the factors are declared, then each carrier multiplies the percentages by the total usage and amount per unit, to calculate amounts owed to each other. To provide accurate jurisdictional factors, one of the applications running on the traffic track system conducts a study, based on the accumulated CDR database, to determine the PIU/PLU involved in interconnect traffic across the interface between a LEC and a CLEC.

The application for the PIU/PLU study provides the following information:

1) Identification of all calls that have CALLING NUMBER (Orig. Number) supplied;
2) Quantify MOU by CALLED NUMBER NPA/NXX;
3) Quantify Peg Count by CALLED NUMBER NPA/NXX;
4) Total MOU for calls where CALLING NUMBER not provided; and
5) Breakout of usage and peg count (using NPA/NXX distinction) by local vs. interstate terminations.

The Key Metrics needed for the PIU/PLU application include:

1) Identification of TERMINATING calls;
2) Aggregate MOU and Peg Count; and
3) % Comparison by NPA/NXX.

The percentage calculations utilize queries to the relational database 60. The queries are written in Structured Query Language (SQL) and generally operate directly on the particular relational database. In the preferred embodiments, the relational database is an Oracle database. The Gentia MDDB preferably performs the OLAP processing, including the user interface functions that enable a user to execute the study application and related programming. The user could write queries against the SS7 relational database, but preferably, the user interacts with the MDDB, and the MDDB launches the appropriate queries. For example, if we have study data collected from the B and D links for interconnect traffic through the tandem office 17, the MDDB program will translate a request for specific types of call data to an appropriate SQL command for a desired percentage calculation.

For example, such a query might ask for the call records with an origination point code having a member number of 247, which may be that of the LEC. The relational database would respond by providing the records for all calls that originated in the LEC network $3_1$ for destinations served by the CLEC network $3_2$. From these records, the application in the MDDB 80 would calculate various usage statistics, including Centi-Call Second (CCS) or Minutes of Use (MOU) as measures of connect time. The statistics would also include the peg count, which is simply the number of originated calls whether completed or not. The application may also calculate the number of completed calls. The application can obtain the records and calculate these statistics for the full period of the study, e.g. for the CLEC billing cycle, or for any shorter time period selected by the user.

In a similar manner, the study application queries the database, obtains CDRs and calculates statistics for the total calls carried by the tandem 17 into the CLEC network $3_2$. From the total call statistics and the LEC network originated statistics, the application calculates the percentage of local traffic originated from the LEC network $3_1$ and terminated in the CLEC network $3_2$, based on any one or each of the different usage measures selected by the user. By conducting a corresponding study on calls originating in the CLEC network $3_2$, i.e. using records having the CLEC member number in the originating point code, the application determines similar percentages for local calls from CLEC subscribers.

This same approach is used to obtain statistics for calls originating or terminating through an IXC and going to or coming from the CLEC network $3_2$. Having determined the number of calls and usage connect time, the application calculates the percentage of CLEC interconnect traffic that relates to Inter-LATA calls.

Another issue that arises involves reciprocal compensation for calls relating to Internet access traffic. LECs argue that these calls should not be subject to reciprocal compensation because they are not intra-LATA calls, under the definition of the Telecom Act. A call bound for the Internet should an inter-LATA call. Prior to the invention, there was no way to measure such calls from a LEC to an ISP subscribing to telephone service through a CLEC.

Another application running on the traffic track system analyzes the call detail records to identify unique patterns of traffic to called parties. For an ISP finder application, in particular, the analysis involves identifying telephone numbers of destinations receiving a high volume of calls and having connections exhibiting a long average hold time. To further enhance the ISP finder analysis, the call data may be examined to confirm that there is no outgoing call traffic from any station associated with the candidate ISP numbers. When numbers are identified by the call data analysis, a technician can call each number and listen for a modem tone, as a confirmation that each candidate number actually is of a data service, such as an ISP. This application works with any CDR set compiled by the system, including the CDR set compiled in the CLEC study. As such, the ISP finder application can actually find the number of ISPs, such as the ISP $7_C$, served through the CLEC network $3_2$.

A more detailed description of the major functions of the ISP finder application may be found in commonly assigned application Ser. No. 09/188,679 entitled INTERNET SERVICE PROVIDER (ISP) FINDER, and the detailed disclosure of the ISP finder procedure from that application is entirely incorporated herein by reference.

The results displayed from one of the studies of ISPs served through a CLEC showed the top 15 ISP numbers found, the minutes of use (MOU), the peg count (number of calls) and the average hold time. The average was calculated simply by dividing the MOU by the peg count. This actually results in a low average, because the raw peg count derived from SS7 signaling messages includes calls not completed to the ISP equipment, e.g. because of a busy destination or lack of available circuits.

Having identified the ISP numbers within the CLEC network, a study of the traffic across the trunk connections between the LEC network $3_1$, and the CLEC network $3_2$ can determine the percentage of calls that the LEC terminates to the CLEC that actually are Internet related. The methodology of this percentage study is essentially similar to that of the PIU/PLU study discussed above.

For example, in one study of a CLEC during one 24-hour period, 28% of the traffic measured by MOU was Internet bound. Potentially the LEC could discount 28% of the reciprocal compensation if the LEC had a favorable ruling with the utility commission conceding that such calls are not subject to reciprocal compensation.

In one preferred embodiment specifically designed for study of CLEC interconnect traffic, the CLEC Measures Analysis/Reports provided by the Traffic Track Information System (FIG. 1) fall into two broad categories: Billing Verification and Arbitrage Investigation. The user at terminal 9 may request either report independently or request both for simultaneous analysis. The Billing Verification output is targeted for use in monthly billing reviews with the CLECs. The Arbitrage Investigation output is for internal LEC analysis. The output delivery may be managed via Excel reports derived from various queries on the original CDRs generated from an SS7 collection and stored in the SS7 relational database 60. However, preferably there are appropriate Traffic Track views for these reports in the Gentia MDDB environment 80.

For the Billing Verification and Arbitrage Investigation studies, the, primary collection source for CLEC measures is an SS7 Interconnect Collection. This requires SS7 set up on the B/D links between the LEC STP pair 21, 23 and the STP provider's pair 25, 27 serving the CLEC network $3_2$ that is under study. Regardless of the relative size of the CLEC under study, the entire B/D link set between the STPs needs to be set up for collection. To make the collection more efficient, a filter is set in the site processor 35 to capture only the CDRs that contain the point code(s) of the CLEC under study (OPC and DPC). The current Traffic Track system platform requires these collections to be on-demand, and the collection period may vary. However, the ultimate collection period for the Billing Verification is one that directly matches the bill period, uninterrupted for the full period. The full month, uninterrupted requirement is less stringent in the Arbitrage Investigation.

The Billing Verification uses the following reciprocal compensation measures: % CPN Delivery, Usage verification and 800 Originations from CLEC point codes.

CPN refers to the calling party number. The % CPN Delivery measure involves a breakout of the calls where calling party number was not delivered in the SS7 message, in terms of number of calls and the usage for those calls. The call statistics for calls without CPN delivery are compared to count and usage of all calls broken out by those delivered by CLEC vs. those delivered by the LEC.

Measurement of usage verification provides a breakout of the usage that the LEC terminates to the CLEC, broken out by terminating usage for each CLEC, for each of a series of predefined categories. The categories may include peak vs. off peak, end office vs. tandem termination, and the like. The output for the study of end office vs. tandem terminations would indicate by CLEC point code the MOU and peg count values for each of these two categories of termination, by day and summed for full study period.

The measure of 800 originations from a CLEC provides the peg count and MOU for all 800 calls originated from CLEC point code(s). The results may present the count and usage for all 800,888 traffic, per day and/or for the total study period.

For billing verification, the interconnect traffic analysis provides results for originations from and terminations to the CLEC network. The origination analysis identifies traffic from a CLEC Point Code, through a LEC tandem to an NPA/NXX of any other carrier, i.e. calls where the LEC is not any part of the call other than delivery to the other carrier. The study provides peg count and usage data such as CCS or preferably MOU per CLEC OPC to non-LEC terminations, identified by NPA/NXX of the called number. The output will also provide the point code and the CLLI code of the other carrier's switch, where available from a reference table.

The terminating traffic represents traffic to a CLEC Point Code, through a LEC tandem from an NPA/NXX of another carrier. On such calls, the LEC does not perform any part of the call processing other than delivery to the CLEC from some third party carrier. The study provides peg count and usage data such as CCS or preferably MOU, where the OPC is that of the LEC's tandem, for all CDRs with calling NPA-NXX not owned by the LEC. The study provides the peg count and MOU from non-LEC originations terminated to the CLEC, identified by NPA/NXX of calling number. Again, the output will also provide the point code and the CLLI code of the other carrier's switch where available from a reference table.

To further enhance the results of some studies of CLEC traffic, it may be helpful to analyze other data in the call records. For example, the CDRs developed from the monitoring of SS7 messages include "release codes." Release, codes indicate the reasons for call terminations, when calls are not completed as dialed. Examples include user busy, caller check, number change, out of service, facility rejects, etc. The CDPs capture these codes from the SS7 messages, and the traffic track analysis of the present invention can provide a variety of analytical tools and reports, using the release codes. For example, if there is a mass call-in, e.g. because of a radio station promotion or the like, the analysis system can indicate how many callers got through and how many did not. For those that did not get through, the system can identify by major categories the principle reasons that calls did not go through, for example the number of calls released because the destination station (user) was busy, the number of calls released because no trunks were available, etc.

Of particular note, a release code indicating "no circuit available" in a CDR means that no trunk circuit was available out of the tandem for which the site processor collected the CDRs. If the LEC is collecting CDRs for traffic through the tandem 17, a "no circuit available" code indicates that there was no trunk available out of that tandem 17. However, if there are no circuits available at some point in the CLEC network, it shows up as a different release code, such as a "resource unavailable" code or one of the other types of failures.

If a CLEC complains of blockages, it is possible to analyze the CDR data files to determine the reasons for specific blockages. For example, the LEC might respond to the CLEC complaints by showing study results depicting the number of blockages caused by problems of inadequate service provided by the elements 15, 17 of the CLEC network $3_2$.

LECs must have the capability to monitor, document, trend, and audit the explosive growth of CLEC traffic and related Internet access traffic. As shown by the above description and the drawings, the inventive traffic track system provides the necessary capabilities and allows a LEC to reduce the interconnection expenses and address compliance related issues by performing the following tasks:

1) Monitor and store originating usage to validate CLEC billing;
2) Quantify, validate and provide accurate PIU/PLU measurements;
3) Identify all Internet based usage and associated charges;
4) Provide measurement capabilities to support two way trunks;
5) Generate reports to meet contractual obligations with the CLECs and with other carriers;
6) Provide a decision support database to enable economic modeling to support interconnection contract negotiations; and
7) Provide the ability to bill network tandem interconnect traffic.

The inventive traffic track system provides an efficient, cost effective means of recording usage measurements for interconnect traffic, particularly for CLEC interconnection. The system enables collection and storage of large volumes of call detail data, and further, provides personnel real-time access to information without time consuming analysis of AMA billing information or costly end office switch upgrades. It has been found that the system can collect all originating and terminating CDRs for a CLEC (off the Interconnecting SS7 links), and process these CDRs to clearly identify various traffic characteristics. Basic network usage MOU and peg count measures can be calculated to various levels (time-of-day, Day-of-Week) and directions. The calls can also be analyzed and presented in a way so as to provide an audit the CLEC monthly bill for terminating reciprocal compensation charges. As well, the Traffic Track output can accurately identify the PIU/PLU factors provided by the CLECs, and enable the LEC to support claims that at least some of these expenses may be erroneous.

The traffic track technology described in detail above has applied to analysis of the interconnect traffic through the PSTN. However, the technology may be adapted to study other types of telecommunication networks, such as cell or packet data networks, etc.

As described above, the SS7 monitoring system traps, messages from identified links going to and from the STPs and compiles records from those messages at the site processor level. Other forms of monitoring of the interoffice signaling fall within the scope of the invention. For example, the function of the site processors might be rolled up into processor functions on the card cages. Also, a number of STP vendors have products that can supply message copies to monitoring ports, such that the STP itself performs the trapping function.

From the foregoing it may be seen that the system and methodology of the invention provide a powerful and flexible tool for performing varying investigations and surveillance across the boundaries between carriers' networks. Thus, as examples, it is feasible to determine the volume of traffic, the origin and destination of traffic, identify ISPs, determine the source of the largest amount of traffic to the identified ISPs, and from that information determine optimal solutions to accounting, congestion and overloading problems.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for analyzing a plurality of calls on a telecommunication network, the method comprising the steps of:

capturing particular management data messages, each management data message having information concerning an individual call of a plurality of calls, said particular management data messages generated by a first carrier's telecommunication network during processing of calls associated with a second carrier's telecommunication network;

compiling a detailed record of each of a plurality of interconnect calls crossing an interface between the first carrier's telecommunication network and the second carrier's telecommunication network from the captured particular management data messages;

loading a plurality of detailed records of the plurality of interconnect calls into a table in a database; and processing the detailed records in the database table to form a report of interconnect call traffic crossing the interface between the telecommunication networks, wherein the step of processing comprises:

enhancing the detailed records in the database table:

loading the enhanced detailed records into an on-line analytical processing system; and running a pre-defined study application in the on-line analytical processing system to present specified analytical study results based on the enhanced detailed records.

2. A method as in claim 1, wherein the step of capturing comprises trapping signaling messages exchanged between the first carrier's telecommunication network and the second carrier's telecommunication network during processing of each call crossing the interface.

3. A method as in claim 2, wherein the signaling messages comprise common channel interoffice signaling messages.

4. A method as in claim 1, wherein:

the first carrier's telecommunication network comprises a switched telephone network; and the interface comprises a trunk connection to a tandem switching office of the switched telephone network.

5. A method for analyzing a plurality of calls on a telecommunication network, the method comprising the steps of:

capturing particular management data messages, each management data message having information concerning an individual call of a plurality of calls, said particular management data messages generated by a first carrier's telecommunication network during processing of calls associated with a second carrier's telecommunication network:

compiling a detailed record of each of a plurality of interconnect calls crossing an interface between the first carrier's telecommunication network and the second carrier's telecommunication network from the captured particular management data messages;

loading a plurality of detailed records of the plurality of interconnect calls into a table in a database; and processing the detailed records in the database table to form a report of interconnect call traffic crossing the interface between the telecommunication networks, wherein the step of processing comprises identifying calls passing through the first carrier's telecommunication network between the second carrier's telecommunication network and a third carrier's telecommunication network.

6. A method for analyzing a plurality of calls on a telecommunication network, the method comprising the steps of:

capturing particular management data messages, each management data message having information concerning an individual call of a plurality of calls, said particular management data messages generated by a first carrier's telecommunication network during processing of calls associated with a second carrier's telecommunication network;

compiling a detailed record of each of a plurality of interconnect calls crossing an interface between the first carrier's telecommunication network and the second carrier's telecommunication network from the captured particular management data messages;

loading a plurality of detailed records of the plurality of interconnect calls into a table in a database; and processing the detailed records in the database table to form a report of interconnect call traffic crossing the interface between the telecommunication networks, wherein the step of processing comprises determining volume of data traffic terminating within the second carrier's telecommunication network.

7. A method for analyzing a plurality of calls on a telecommunication network, the method comprising the steps of:

capturing particular management data messages, each management data message having information concerning an individual call of a plurality of calls, said particular management data messages generated by a first carrier's telecommunication network during processing of calls associated with a second carrier's telecommunication network;

compiling a detailed record of each of a plurality of interconnect calls crossing an interface between the first carrier's telecommunication network and the second carrier's telecommunication network from the captured particular management data messages;

loading a plurality of detailed records of the plurality of interconnect calls into a table in a database; and processing the detailed records in the database table to form a report of interconnect call traffic crossing the interface between the telecommunication networks, wherein the step of processing comprises calculating one or more jurisdictional factors.

8. A method for analyzing a plurality of calls on a telecommunication network, the method comprising the steps of:

capturing particular management data messages, each management data message having information concerning an individual call of a plurality of calls, said particular management data messages generated by a first carrier's telecommunication network during processing of calls associated with a second carrier's telecommunication network;

compiling a detailed record of each of a plurality of interconnect calls crossing an interface between the first carrier's telecommunication network and the second carrier's telecommunication network from the captured particular management data messages;

loading a plurality of detailed records of the plurality of interconnect calls into a table in a database; and processing the detailed records in the database table to form a report of interconnect call traffic crossing the interface between the telecommunication networks, wherein the step of processing comprises determining percentage of interconnect traffic that is inter-LATA traffic.

9. A method as in claim 8, wherein the inter-LATA traffic originates in the second carrier's telecommunication network.

10. A method as in claim 8, wherein the inter-LATA traffic terminates in the second carrier's telecommunication network.

11. A method for analyzing a plurality of calls on a telecommunication network, the method comprising the steps of:

capturing particular management data messages, each management data message having information concerning an individual call of a plurality of calls, said particular management data messages generated by a first carrier's telecommunication network during processing of calls associated with a second carrier's telecommunication network;

compiling a detailed record of each of a plurality of interconnect calls crossing an interface between the first carrier's telecommunication network and the second carrier's telecommunication network from the captured particular management data messages:

loading a plurality of detailed records of the plurality of interconnect calls into a table in a database; and processing the detailed records in the database table to form a report of interconnect call traffic crossing the interface between the telecommunication networks, wherein the step of processing comprises determining percentage of interconnect traffic that is local traffic.

12. A method as in claim 11, wherein the local traffic originates within the first carrier's telecommunication network and terminates within the second carrier's telecommunication network.

13. A method as in claim 11, wherein the local traffic originates within the second carrier's telecommunication network and terminates within the first carrier's telecommunication network.

14. A method as in claim 1, wherein the step of enhancing comprises translating at least one item of information from the detail records in the database table into descriptive information using external reference data.

15. A method as in claim 1, wherein the step of enhancing comprises spreading usage data contained in the detail records in the database table of calls extending over a plurality of predetermined intervals into bins associated with the predetermined intervals.

16. A method as in claim 1, wherein the step of enhancing comprises compiling a predefined summary table from data in the detail records in the database table.

17. A method as in claim 1, wherein:
the database comprises a relational database; and the on-line analytical processing system comprises a multi-dimensional database.

18. A method of analyzing interconnect traffic between a local exchange carrier (LEC) and a competing local exchange carrier (CLEC), comprising the steps of:

trapping signaling messages exchanged between a telephone network of the LEC and a telephone network of the CLEC during processing of calls associated with the CLEC telephone network by the LEC telephone network;

processing the trapped signaling messages to form call detail records for each of a plurality of calls associated with the CLEC telephone network processed by the LEC telephone network;

storing the call detail records; and processing the stored call detail records to form a report of interconnect call traffic crossing between the LEC and CLEC telephone networks, wherein the step of processing comprises identifying calls passing through the LEC telephone network between the CLEC telephone network and a network of another carrier.

19. A method of analyzing interconnect traffic between a local exchange carrier (LEC) and a competing local exchange carrier (CLEC), comprising the steps of:

trapping signaling messages exchanged between a telephone network of the LEC and a telephone network of the CLEC during processing of calls associated with the CLEC telephone network by the LEC telephone network;

processing the trapped signaling messages to form call detail records for each of a plurality of calls associated with the CLEC telephone network processed by the LEC telephone network;

storing the call detail records; and processing the stored call detail records to form a report of interconnect call traffic crossing between the LEC and CLEC telephone networks, wherein the step of processing comprises determining volume of Internet access traffic terminating within the CLEC telephone network.

20. A method of analyzing interconnect traffic between a local exchange carrier (LEC) and a competing local exchange carrier (CLEC), comprising the steps of:

trapping signaling messages exchanged between a telephone network of the LEC and a telephone network of the CLEC during processing of calls associated with the CLEC telephone network by the LEC telephone network;

processing the trapped signaling messages to form call detail records for each of a plurality of calls associated with the CLEC telephone network processed by the LEC telephone network;

storing the call detail records; and processing the stored call detail records to form a report of interconnect call traffic crossing between the LEC and CLEC telephone networks, wherein the step of processing comprises calculating one or more jurisdictional factors.

21. A method of analyzing interconnect traffic between a local exchange carrier (LEC) and a competing local exchange carrier (CLEC), comprising the steps of:

trapping signaling messages exchanged between a telephone network of the LEC and a telephone network of the CLEC during processing of calls associated with the CLEC telephone network by the LEC telephone network;

processing the trapped signaling messages to form call detail records for each of a plurality of calls associated with the CLEC telephone network processed by the LEC telephone network;

storing the call detail records; and processing the stored call detail records to form a report of interconnect call traffic crossing between the LEC and CLEC telephone networks, wherein the step of processing comprises determining percentage of interconnect traffic that is inter-LATA traffic.

22. A method of analyzing interconnect traffic between a local exchange carrier (LEC) and a competing local exchange carrier (CLEC), comprising the steps of:

trapping signaling messages exchanged between a telephone network of the LEC and a telephone network of the CLEC during processing of calls associated with the CLEC telephone network by the LEC telephone network;

processing the trapped signaling messages to form call detail records for each of a plurality of calls associated with the CLEC telephone network processed by the LEC telephone network;

storing the call detail records; and processing the stored call detail records to form a report of interconnect call traffic crossing between the LEC and CLEC telephone networks, wherein the step of processing comprises determining percentage of interconnect traffic that is local traffic.

23. A method as in claim 22, wherein the local traffic comprises traffic originating within the LEC telephone network and terminating within the CLEC telephone network.

24. A method as in claim 22, wherein the local traffic comprises traffic originating within the CLEC telephone network and terminating within the LEC telephone network.

25. A system for analyzing a plurality of calls on a telecommunication network, the system comprising:

a monitoring system associated with a first carrier's telecommunication network for capturing particular management data messages, each management data message having information concerning an individual call of a plurality of calls, said particular management data messages generated during processing of calls for a second carrier's telecommunication network by the first carrier's telecommunication network;

a processor for receiving the captured particular management data messages from the monitoring system and for compiling a detailed record of each of a plurality of interconnect calls between the first carrier's telecommunication network and the second carrier's telecommunication network from the captured messages;

a database for storing a plurality of detailed records of the plurality of interconnect calls in a table; and an on-line processing system for reporting aggregate interconnect traffic crossing the interface between the telecommunication networks based on one or more of the plurality of detailed records from the database.

26. A system as in claim 25, wherein:

the database comprises a relational database; and the on-line processing system comprises a multi-dimensional database.

27. A system as in claim 26, wherein the on-line processing system further comprises a study application running on the multi-dimensional database, for aggregating data indicative of a predetermined characteristic of the interconnect traffic.

28. A system as in claim 25, wherein the monitoring system comprises monitors coupled to interoffice signaling links between the first carrier's telecommunication network and the second carrier's telecommunication network.

29. A system as in claim 28, wherein the monitors trap signaling system 7 protocol messages.

30. The method of claim 1, wherein a plurality of the particular management data messages have information about a certain interconnect call of the plurality of calls.

31. The method of claim 20, wherein a plurality of trapped signaling messages have information about a particular interconnect of the calls associated with the CLEC telephone network.

32. The system of claim 25, wherein a plurality of the particular management data messages have information about a certain interconnect call of the plurality of calls.

* * * * *